US011977427B2

(12) United States Patent
Fox

(10) Patent No.: US 11,977,427 B2
(45) Date of Patent: *May 7, 2024

(54) TELEMATICS DEVICE WITH INPUT/OUTPUT EXPANSION POWER FAULT HANDLING

(71) Applicant: Geotab Inc., Oakville (CA)

(72) Inventor: Stephen Michael Fox, Oakville (CA)

(73) Assignee: Geotab Inc., Oakville (CA)

( * ) Notice: Subject to any disclaimer, the term of this patent is extended or adjusted under 35 U.S.C. 154(b) by 86 days.

This patent is subject to a terminal disclaimer.

(21) Appl. No.: 17/893,440

(22) Filed: Aug. 23, 2022

(65) Prior Publication Data

US 2023/0072000 A1   Mar. 9, 2023

Related U.S. Application Data

(63) Continuation-in-part of application No. 17/665,125, filed on Feb. 4, 2022, now Pat. No. 11,494,281.

(60) Provisional application No. 63/236,812, filed on Aug. 25, 2021.

(51) Int. Cl.
   *G06F 1/30*   (2006.01)
(52) U.S. Cl.
   CPC ..................................... *G06F 1/30* (2013.01)
(58) Field of Classification Search
   CPC ........................................................ G06F 1/30
   See application file for complete search history.

(56) References Cited

U.S. PATENT DOCUMENTS

| 5,029,269 | A | 7/1991 | Elliott |
| 6,512,466 | B2 | 1/2003 | Flick |
| 6,819,269 | B2 | 11/2004 | Flick |
| 6,844,827 | B2 | 1/2005 | Flick |
| 7,312,696 | B2 | 12/2007 | Flick |
| 7,683,774 | B2 | 3/2010 | Olsen et al. |
| 9,110,805 | B1 | 8/2015 | Tsai |
| 9,811,404 | B2 * | 11/2017 | Sato ..................... G06F 11/1645 |
| 9,872,225 | B2 | 1/2018 | Guba et al. |
| 9,981,615 | B2 | 5/2018 | Flick |
| 9,981,616 | B2 | 5/2018 | Flick |
| 10,173,547 | B1 | 1/2019 | Denson |

(Continued)

FOREIGN PATENT DOCUMENTS

| EP | 3125579 A2 | 2/2017 |
| EP | 3125579 B1 | 6/2018 |

OTHER PUBLICATIONS

EESR dated Jan. 19, 2023, EPO.

(Continued)

*Primary Examiner* — Zahid Choudhury
(74) *Attorney, Agent, or Firm* — Sherif A. Abdel-Kader

(57) ABSTRACT

A method for handling power faults in a primary electronic device is provided. The method includes setting a power-off duration to an initial value and powering on a hardware interface. In response to detecting a power fault at the hardware interface, the hardware interface is power-cycled by a plurality of power cycles having progressively increasing power-off durations until a limit is reached. A primary electronic device for carrying out the method is also provided. The primary electronic device includes a controller, a memory, and a hardware interface for coupling the telematics device to a secondary electronic device.

20 Claims, 14 Drawing Sheets

(56) References Cited

U.S. PATENT DOCUMENTS

| | | |
|---|---|---|
| 11,127,226 B2 | 9/2021 | Zucconelli et al. |
| 11,675,042 B1 | 6/2023 | Lloyd et al. |
| 11,709,500 B2 | 7/2023 | Lloyd et al. |
| 2009/0187779 A1 | 7/2009 | Liu |
| 2010/0174448 A1 | 7/2010 | Mueller |
| 2012/0278601 A1 | 11/2012 | Chang |
| 2014/0101419 A1 | 4/2014 | Giddi |
| 2016/0204593 A1 | 7/2016 | Djelassi |
| 2017/0031782 A1 | 2/2017 | Totten |
| 2018/0022299 A1 | 1/2018 | Han |
| 2018/0219371 A1 | 8/2018 | Sanacore |
| 2021/0318692 A1 | 10/2021 | Lloyd et al. |

OTHER PUBLICATIONS

Extended European Search Report for European Application No. 22191409.6, mailed Jan. 19, 2023, 9 Pages.

Extended European Search Report for European Application No. 22191902.0, mailed Jan. 26, 2023, 8 Pages.

\* cited by examiner

TELEMATICS DEVICE WITH INPUT/OUTPUT EXPANSION POWER FAULT HANDLING

FIELD

The present disclosure relates generally to electronic component protection against electric power faults, and more specifically to methods and devices for handling electric power faults in a hardware interface of a primary electronic device coupled to a secondary electronic device.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method by a primary electronic device for handling power faults on a secondary electronic device coupled to the primary electronic device via a hardware interface. The method comprises detecting a power fault condition on the hardware interface and power-cycling the hardware interface by a plurality of power cycles having a plurality of progressively increasing power-off durations. After each power cycle of the plurality of power cycles, the method includes checking the power fault condition and permanently powering off the hardware interface if the power fault condition is detected and a current power-off duration of the plurality of progressively increasing power-off durations has reached a power-off duration limit.

Powering off the hardware interface may include setting an indication in a persistent storage that the hardware interface has been powered off due to a power fault.

The method may further comprise clearing the indication that the hardware interface has been powered off due to the power fault condition in response to detecting that the secondary electronic device has been unplugged from the hardware interface.

The method may further comprise checking the indication in the persistent storage upon powering up of the primary electronic device and refraining from powering up the hardware interface in response to determining that the hardware interface has been powered off due to the power fault condition.

Detecting the power fault condition may comprise detecting by a power protection module of the hardware interface one of an overcurrent condition, an overvoltage condition, and a reverse current condition.

Progressively increasing the power-off durations may comprise increasing the current power-off duration between two successive power cycles.

Detecting the power fault condition on the hardware interface may comprise receiving an indication from a power protection module of the power fault condition.

Receiving the indication from the power protection module may comprise receiving one of: a signal change on a pin or an interrupt signal.

In another aspect of the present disclosure, there is provided a telematics device. The telematics device comprises a controller, a hardware expander interface coupled to the controller, the hardware interface for coupling the primary electronic device to a secondary electronic device. The primary electronic device further comprises a memory coupled to the controller. The memory is for storing machine-executable programming instructions which when executed by the controller configure the primary electronic device to in response to detecting a power fault condition on the hardware interface, power-cycle the hardware interface by a plurality of power cycles having progressively increasing power-off durations, after each power cycle of the plurality of power cycles, check the power fault condition, and permanently power off the hardware interface if the power fault condition is detected and a current power-off duration of the progressively increasing power-off durations has reached a power-off duration limit.

The machine-executable programming instructions which configure the primary electronic device to power off the hardware interface may comprise machine-executable programming instructions which configure the primary electronic device to set an indication in a persistent storage that the hardware interface has been powered off due to a power fault.

The machine-executable programming instructions may further comprise machine-executable programming instructions which configure the primary electronic device to clear the indication that the hardware interface has been powered off due to the power fault condition in response to detecting that the secondary electronic device has been unplugged from the hardware interface.

The machine-executable programming instructions may further comprise machine-executable programming instructions which configure the primary device to check the indication in the persistent storage upon powering up of the primary electronic device and refrain from powering up the hardware interface in response to determining that the hardware interface has been powered off due to the power fault condition.

The machine-executable programming instructions which configure the primary electronic device to detect the power fault condition may comprise machine-executable programming instructions which configure the primary electronic device to detect one of: an overcurrent condition, an overvoltage condition, and a reverse current condition.

The machine-executable programming instructions which configure the primary electronic device to progressively increase the progressively increasing power-off durations may comprise machine-executable programming instructions which configure the primary electronic device to increase the current power-off duration between two successive power cycles.

The machine-executable programming instructions which configure the primary electronic device to detect the power fault condition on the hardware interface may comprise machine-executable programming instructions which configure the primary electronic device to receive an indication from a power protection module of the power fault condition.

The machine-executable programming instructions which configure the primary electronic device to receive the indication from the power protection module may comprise machine-executable programming instructions which configure the primary electronic device to receive one of: a signal change on a pin or an interrupt signal.

In yet another aspect of the present disclosure, there is provided a method by a primary electronic device having a secondary electronic device coupled thereto via a hardware interface of the primary electronic device. The method comprises setting a secondary electronic device power-off duration to an initial value and powering on the hardware interface of the primary electronic device. In response to detecting a power fault at the hardware interface, the method includes powering off the hardware interface for the secondary electronic device power-off duration, and increasing the power-off duration. The method further includes repeating the steps of powering on, powering off, increasing the power-off duration, while the secondary device power-off duration is not greater than the power-off duration limit. The method further includes permanently powering off the hardware interface when the secondary electronic device power-off duration is greater than the power-off duration limit.

In some embodiments, increasing the power-off duration comprises doubling the power-off duration.

In some embodiments, increasing the power-off duration comprises quadrupling the power-off duration.

In some embodiments, detecting the power fault comprises receiving an interrupt signal from a power protection module of the I hardware interface.

In some embodiments, detecting the power fault comprises polling for a signal from a power protection module of the hardware interface.

In some embodiments, the method further includes receiving a request for secondary electronic device data from a telematics server.

In some embodiments, the method further includes sending to the telematics server an indication that the secondary electronic device data will not be delivered due to the power fault when the hardware interface has been permanently powered off.

In some embodiments, the method further includes sending to the telematics server an indication to retry the request after the I/O expander power-off duration.

In some embodiments, powering on the hardware interface comprises configuring a power protection module to turn on a power signal provided to a power pin on a hardware port of the hardware interface.

In some embodiments, powering off the hardware interface comprises configuring a power protection module to turn off a power signal provided to a power pin on a hardware port of the hardware interface.

In a further aspect of the present disclosure, there is provided a primary electronic device including a controller, a hardware interface coupled to the controller, and a memory coupled to the controller. The memory stores machine-executable programming instructions, which when executed by the controller configure the primary electronic device to set a secondary electronic device power-off duration to an initial value, power on the hardware interface, and in response to detecting a power fault at the hardware interface: power off the hardware interface for the secondary electronic device power-off duration and increase the secondary electronic device power-off duration. The machine-executable programming instructions further configure the primary electronic device to permanently power off the hardware interface when the secondary electronic device power-off duration is greater than a power-off duration limit. The machine-executable programming instructions further configure the primary electronic device to repeat the steps of powering on the hardware interface, powering off the hardware interface in response to detecting the power fault, permanently powering off the hardware interface when the secondary electronic device power-off duration is greater than a power-off duration limit, when the secondary electronic device power-off duration is not greater than the power-off duration limit.

In some embodiments, the machine-executable programming instructions which increase the secondary electronic device power-off duration comprise machine-executable programming instructions which double the secondary electronic device power-off duration.

In some embodiments, the machine-executable programming instructions which increase the secondary electronic device power-off duration comprise machine-executable programming instructions which quadruple the secondary electronic device power-off duration.

In some embodiments, the hardware interface comprises a power protection module and the machine-executable instructions programming further comprise machine-executable programming instructions for handling an interrupt signal from the power protection module.

In some embodiments, the hardware interface comprises a power protection module, and the machine-executable programming instructions further comprise machine-executable programming instructions for polling a signal from the power protection module.

In some embodiments, the hardware interface comprises a power protection module, and the machine-executable instructions further comprise machine-executable instructions for controlling the power protection module.

In some embodiments, the machine-executable programming instructions further comprise machine-executable programming instructions which configure the primary electronic device to receive a request for secondary electronic device data from a telematics server.

In some embodiments, the machine-executable programming instructions further comprise machine-executable programming instructions which configure the primary electronic device to send an indication to the telematics server that the secondary electronic device data cannot be provided.

In some embodiments, the machine-executable programming instructions further comprise machine-executable programming instructions which configure the primary electronic device to send an indication to the telematics server to retry sending the request for secondary electronic device data after the secondary electronic device power-off duration.

In yet a further aspect of the present disclosure, there is provided a non-transitory machine-readable storage medium storing machine-executable programming instructions that when executed cause a processor to set a secondary electronic device power-off duration to an initial value, power on the hardware interface of a primary electronic device, and in response to detecting a power fault at the hardware interface: power off the hardware interface for the secondary electronic device power-off duration, and increase the secondary electronic device power-off duration. The machine-executable programming instructions also cause the processor to permanently power off the hardware interface when the secondary electronic device power-off duration is greater than a power-off duration limit. The machine-executable programming instructions further cause the processor to repeat the steps of setting a secondary electronic device power-off duration, powering on the hardware interface, powering off the hardware interface in response to detecting the power fault, and permanently powering off the hardware interface when the secondary electronic device power-off duration is greater than the power-off duration limit, when the secondary electronic device power-off duration is not greater than the power-off duration limit.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
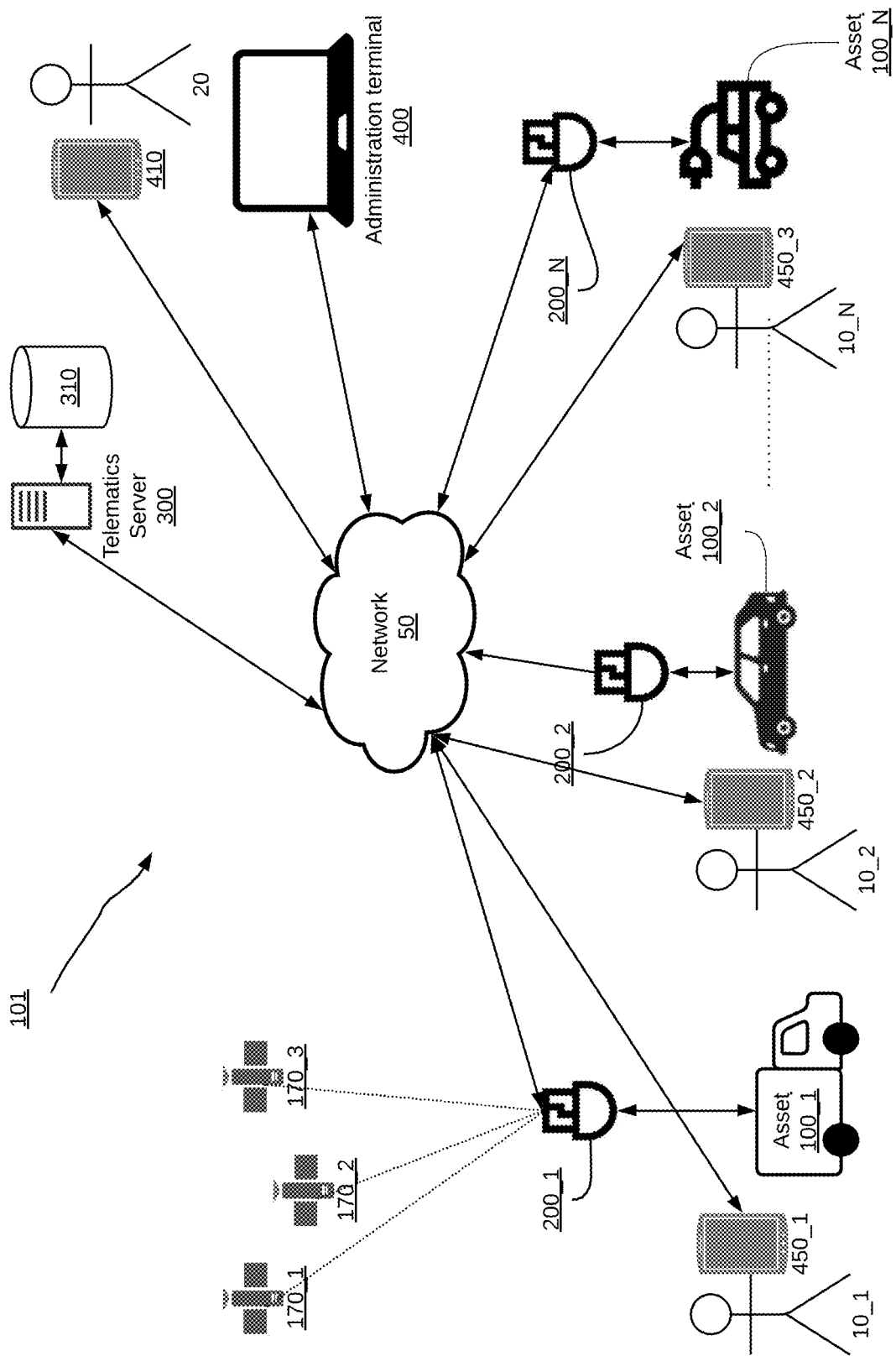
FIG. 1 is a schematic diagram of a telematics system including a plurality of telematics devices coupled to a plurality of assets.
Figure 2:
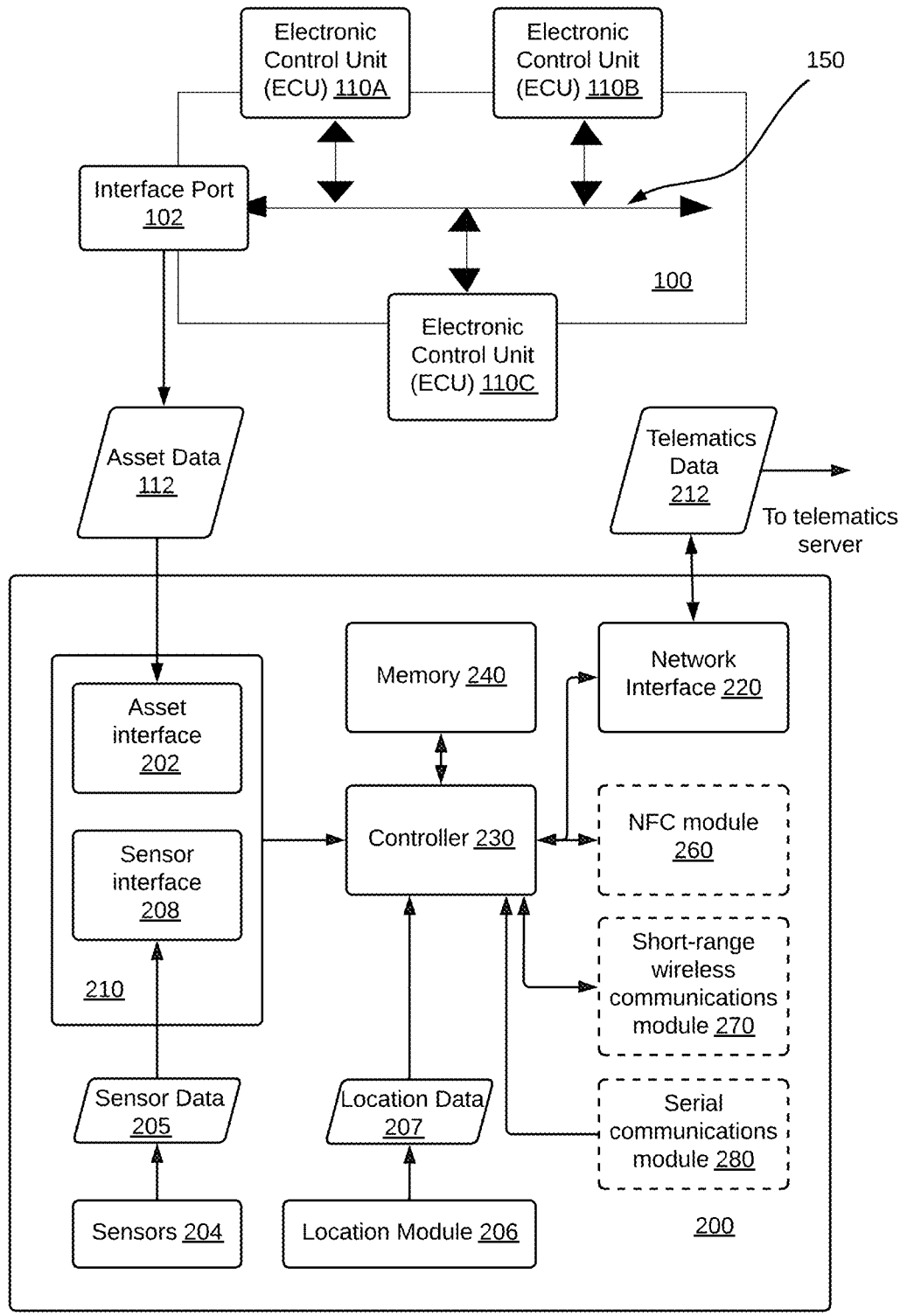
FIG. 2 is a block diagram showing a telematics device coupled to an asset.

A large telematics system may collect data from a high number of assets, either directly or through telematic devices. A telematics device may refer to a self-contained device coupled to an asset, or a telematics device that is integrated into the asset itself. In either case, it may be said that asset data is being captured or gathered by the telematics device. Detailed operation of an exemplary telematics system 101 and its components are best described with reference to FIG. 1 and FIG. 2. FIG. 1 shows a high-level block diagram of a telematics system 101, while FIG. 2 shows a detailed view of an asset 100 and a telematics device 200 coupled to the asset 100. The telematics system 101 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminal 450"). FIG. 1 also shows a plurality of (N) assets named as asset 100_1, asset 100_2 . . . asset 100_N ("asset 100") coupled to the telematics device 200_1, the telematics device 200_2 . . . the telematics device 200_N, respectively. Additionally, FIG. 1 shows a plurality of satellites 170_1, 170_2 and 170_3 ("satellite 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like. Additionally, the asset 100 may be any industrial equipment or machine, which can be monitored by a telematics device 200 coupled thereto.

The telematics devices 200 are electronic devices which are coupled to the assets 100 and are configured to capture asset data 112 from the assets 100. The telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable programming instructions which enable the telematics server 300 to store and analyze telematics data 212. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50 and may receive telematics data 212 from the telematics devices 200. The telematics server 300 may have a plurality of software modules for performing data analysis and analytics on the telematics data 212 to derive useful information pertaining to the assets 100 and/or the operators 10. The telematics server 300 may be coupled to a telematics database 310 for storing the telematics data 212 and/or the results of the analytics which are related to the assets 100. The telematics data 212 stored may include sensor data 205 obtained from the sensors 204 deployed in the telematics device 200. The telematics server 300 may communicate the telematics data 212 or the derived information therefrom to one or more of: the administration terminal 400, the handheld administration terminal 410, and the operator terminal 450. In some instances, the telematics server 300 may send configuration commands to the telematics device 200 to configure the operation of the telematics device 200. For example, a fleet manager 20 may use an administration terminal 400 to configure a telematics device 200 to carry out a particular function or operate in a particular mode. The administration terminal 400 may send a configuration request to the telematics server 300, which in turn forwards it to the telematics device 200.

The satellites 170 may be part of a global navigation satellite system (GNSS) and may provide positioning information to the telematics devices 200. The positioning information may be processed by a location module on the telematics device 200 to provide location data 207 indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100 or to issue commands to one or more telematics device 200 via the telematics server 300. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface 325 of the telematics server 300. The handheld administration terminal 410 may run a mobile application for communicating with the telematics server 300, the mobile application allowing retrieving data and analytics therefrom. The mobile application of the handheld administration terminal may also be used to issue commands to one or more telematics device 200 via the telematics server 300 as discussed above. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of the assets 100. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is currently being operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating. In some embodiments, the operator terminal 450 may communicate directly with the telematics device 200 over a wired connection or over a short-range wireless connection.

In operation, a telematics device 200 is coupled to an asset 100 to capture the asset data 112. The asset data 112 may be combined with the location data 207 obtained by the telematics device 200 from a location module 206 in communication with the satellites 170 and/or sensor data gathered from sensors in the telematics device 200 or another device coupled to the telematics device 200. The combination of the asset data 112, the location data 207, and the sensor data 205 comprise the telematics data 212. The telematics device 200 sends the telematics data 212, to the telematics server 300 over the network 50. The telematics server 300 may process, aggregate, and analyze the telematics data 212 to generate or derive asset information pertaining to an asset 100, to an operator 10, and/or to a fleet of assets. The telematics server 300 may store the telematics data 212 and/or the generated asset information in the telematics database 310. The administration terminal 400 may connect to the telematics server 300, over the network 50, to access the generated asset information. Alternatively, the telematics server 300 may push the generated asset information to the administration terminal 400. Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data 212 may include turning, speeding, and braking information. The telematics server 300 can correlate the telematics data to the asset's operator 10 by querying the asset database 310. A fleet manager 20 may use the administration terminal 400 to set alerts for certain activities pertaining to the assets 100. When criteria for an alert is met, the telematics server 300 sends a message to the fleet manager's administration terminal 400, and may optionally send alerts to the operator terminal 450 to notify an operator 10 of the alert. For example, a vehicle driver operating the vehicle outside of a service area or hours of service may receive an alert on their operator terminal 450. A fleet manager 20 may also use the administration terminal 400 to configure a telematics device 200 by issuing commands thereto via the telematics server 300.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs) 110. An ECU 110 is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle asset may, for example, have around seventy ECUs. For simplicity, only a few of the ECUs 110 are depicted in FIG. 2. For example, in the depicted embodiment the asset 100 has three electronic control units: ECU 110A, ECU 110B, and ECU 110C ("ECUs 110"). The ECU 110A, the ECU 110B, and the ECU 110C are shown to be interconnected via an asset communications bus, such as a Controller Area Network (CAN) bus 150. The ECUs 110, which are interconnected using the CAN bus 150 send and receive information to one another in CAN data frames by placing the information on the CAN bus 150. When an ECU 110 places information on the CAN bus 150, other ECUs 110 receive the information and may or may not consume or use that information. Different protocols may be used to exchange information between the ECUs 110 over a CAN bus 150. For example, ECUs 110 in trucks and heavy vehicles use the Society of Automotive Engineering (SAE) J1939 protocol to exchange information over a CAN bus 150. Most passenger vehicles use the SAE J1979 protocol, which is commonly known as On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 coupled thereto.

The telematics device 200 includes a telematics device controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source such as a battery or a solar panel. In other embodiments, the telematics device 200 may receive electric power directly from the asset 100, via the interface port 102. In some embodiments, some of the components of the telematics device 200 shown in solid lines in FIG. 2 may also be optional and may be implemented in separate modules. For example, some telematics devices 200 (not shown) may not have a location module 206 and may rely on an external location module for obtaining the location data 207. Some telematics devices may not have any sensors 204 and may rely on external sensors for obtaining sensor data 205. The external location modules and external sensors may be coupled to the telematics device via the short-range wireless communications module 270 or via a wired communications module such as the serial communications module 280.

The telematics device controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the telematics device controller 230 as described herein. The telematics device controller 230 may have an internal memory for storing machine-executable programming instructions to conduct the methods described herein. Alternatively, the telematics device controller 230 may be coupled to an external memory, such as the memory 240 and execute machine-executable programming instructions stored in the memory 240.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the telematics device controller 230 thus enabling the telematics device controller 230 to execute the machine-executable programming instructions stored in the memory 240 and to access the data stored therein. The memory 240 may contain machine-executable programming instructions, which when executed by the telematics device controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the telematics device controller 230, configures the telematics device 200 to transmit the telematics data 212 via the network interface 220 to a telematics server 300 over a network 50. In some embodiments, the memory 240 only stores data, and the machine-executable programming instructions for conducting the aforementioned tasks are stored in an internal memory of the telematics device controller 230.

The location module 206 may be a global positioning system (GPS) transceiver or another type of location determination peripheral that may use, for example, wireless network information for location determination. The location module 206 is coupled to the telematics device controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors 204 provide sensor data 205 to the telematics device controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the asset data 112 may describe the speed at which the vehicle is travelling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the telematics device controller 230 and provides both the asset data 112 and the sensor data 205 to the telematics device controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for storage and analysis. The network interface 220 may also be used to receive instructions from the telematics server 300 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 300.

The short-range wireless communications module 270 provides short-range wireless communication capability to the telematics device 200. The short-range wireless communications module 270 may be a Bluetooth™, wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I²C) bus. As another example, the serial communications module 280 may be a universal serial bus (USB) transceiver.

In operation, the ECUs 110, such as the ECU 110A, the ECU 110B, or the ECU 110C each places a portion of the asset data 112 on the CAN bus 150. The asset data 112 comprises all portions of asset data exchanged, between the ECUs 110, over the CAN bus 150. The CAN bus 150 is accessible via the interface port 102. The telematics device 200 reads the asset data 112 from the CAN bus 150 over the interface port 102 and the asset interface 202 which is connected to the interface port 102. The telematics device controller 230 receives the asset data 112 via the asset interface 202. The telematics device controller 230 may also receive sensor data 205 from the sensors 204 over the sensor interface 208. Furthermore, the telematics device controller 230 may receive location data 207 from the location module 206. The telematics device controller 230 combines the asset data 112 with the sensor data 205 and the location data 207 to obtain the telematics data 212. The telematics device controller 230 transmits the telematics data 212 to the telematics server 300 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 300. The received commands instruct the telematics device 200 to be configured in a particular way. For example, the received commands may configure the way in which the telematics device 200 gathers asset data 112 from the asset 100.

The telematics data 212, which is comprised of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities. Some applications may require additional sensors, such as temperature sensors, humidity sensors, pressure sensors, conductivity sensors, pH sensors, and the like. To modify the telematics device 200 to include all of the aforementioned sensors and peripherals would be impractical. Not all applications require the additional sensors and the size and complexity of the telematics device 200 would be increased.

Input/Output Expander

Figure 3:
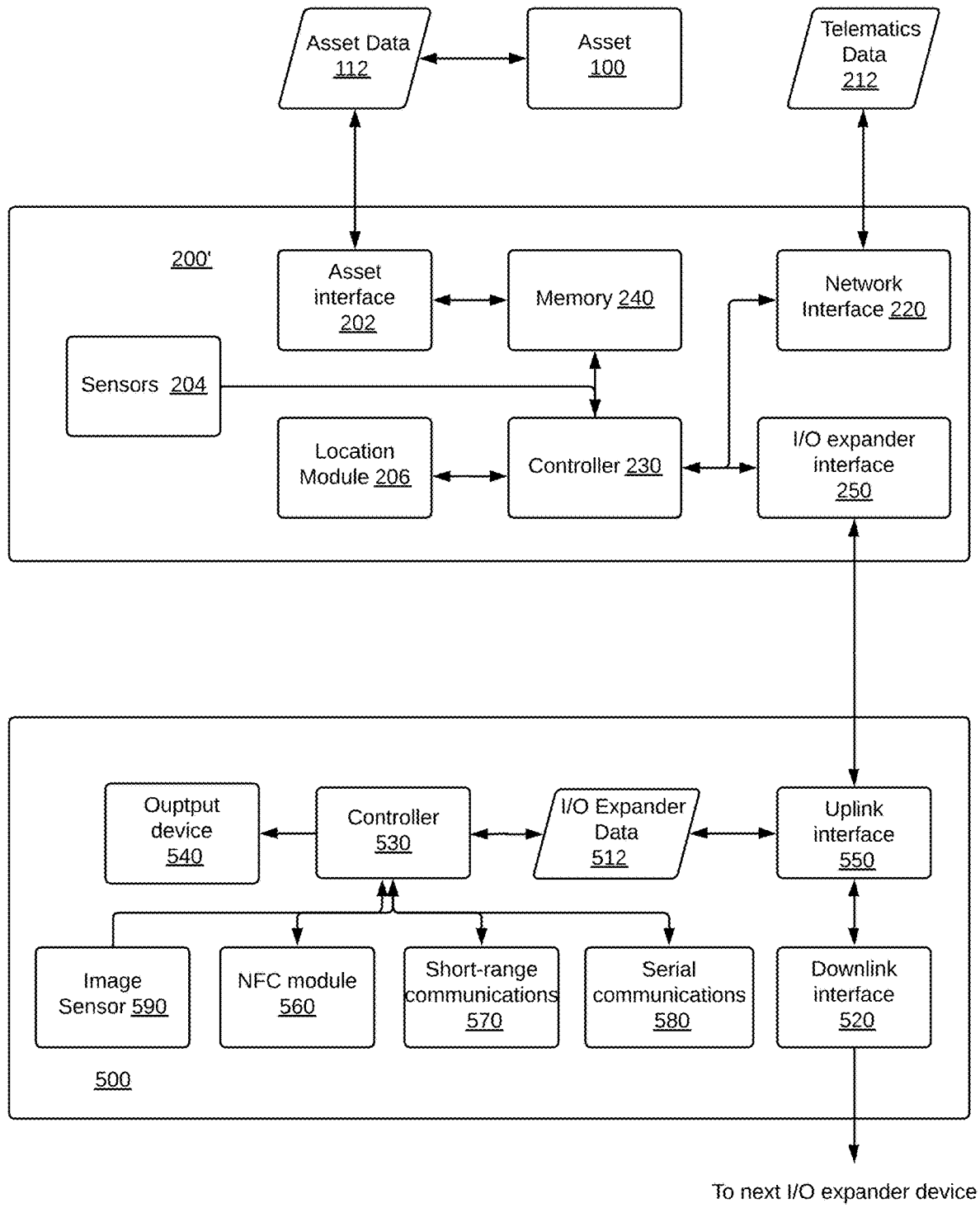
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 200' coupled to an asset 100. An I/O expander 500 is coupled to the telematics device 200'.

The asset 100 is similar to the asset 100 of FIG. 2 and therefore the internal components thereof are not shown in FIG. 3 for simplicity.

The telematics device 200' has a somewhat similar configuration to the telematics device 200 of FIG. 2, but some of the optional components have been removed. Furthermore, the telematics device 200' adds an I/O expander interface 250 for interfacing with the I/O expander 500. The I/O expander interface 250 is coupled to the telematics device controller 230 and may be configured for exchanging I/O expander data 512 with the I/O expander 500.

The I/O expander 500 of FIG. 3 is an example I/O expander which is designed to provide additional connectivity options to a telematics device 200, which has more limited features than the one shown in FIG. 2. For example, the telematics device 200' shown in FIG. 3 does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 3 shows an I/O expander 500 containing several components which may or may not all be present in other I/O expanders. For example, the I/O expander 500 includes a controller 530, an NFC module 260, an output device 540, a short-range communications module 570, an image sensor 590, a serial communications module 580, an uplink interface 550 and a downlink interface 520.

The controller 530 may be similar to the telematics device controller 230 of FIG. 3. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for conducting the functionality of the I/O expander 500 may be stored. In other embodiments, the controller 530 may be coupled to a persistent memory module (not shown) that contains the machine-executable programming instructions for conducting the functionality of the I/O expander 500. The controller 530 may also have built-in volatile memory, such as random-access memory (RAM) for storing data. Alternatively, the I/O expander 500 may be connected to an external volatile memory for storing data.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2.

The image sensor 590 may be a digital still camera or a digital video camera capable of capturing images. For example, the image sensor 590 may be a road-facing dashboard camera for monitoring the road ahead. In other examples, the image sensor 590 may be a driver-facing dashboard camera for identifying the operator 10 and/or their condition.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500. Allowing the uplink interface 550 to connect to the downlink interface 520 of another I/O expander 500 allows the daisy chaining of I/O expanders 500. Accordingly, I/O expander data 512 received at the downlink interface 520 may be routed to the uplink interface 550. Additionally, power signals from the uplink interface 550 of the I/O expander 500 are coupled to power pins of the downlink interface 520. This allows the I/O expander 500 to power another I/O expander connected thereto in a daisy chain of I/O expanders. For example, a telematics device 200 may provide power up to a number of I/O expanders 500. This is further described below.

The I/O expander 500 may be configured as an input expander, as an output expander, or as an input and an output (I/O) expander.

Configured as an input expander, one or more of the image sensor 590, the NFC module 560, the short-range communications module 570 and the serial communication module 580 may provide input data to be processed by the controller 530 to generate the I/O expander data 512. The I/O expander data 512 is in a format that can be consumed by the telematics device 200. The controller 530 configures the uplink interface 550 to send the I/O expander data 512 to the telematics device 200 via the I/O expander interface 250 of the telematics device 200.

Configured as an output expander, the I/O expander 500 receives I/O expander data 512 from the telematics device 200 over the uplink interface 550. The controller 530 receives the I/O expander data 512 from the uplink interface 550 and may perform further processing on the I/O expander data 512. The controller 530 then sends the I/O expander data 512 to the output device 540, or to an external output device connected to the I/O expander via one of the NFC module 560, the short-range communications module 570, and the serial communications module 580.

In some embodiments, multiple I/O expanders 500 may be daisy chained. The I/O extension devices are typically daisy chained to provide additional functionality without having to include multiple I/O expansion interfaces 250 on the telematics device 200. Daisy chaining the multiple I/O expanders 500 is done by connecting the uplink interface 550 of one I/O expansion device to the downlink interface 520 of a preceding I/O expander 500. For example, with reference to FIG. 4, there is shown a system having an asset 100, a telematics device 200 coupled to the asset 100, a first I/O expander 500A connected to the telematics device 200, a second I/O expander 500B connected to the first I/O expander 500A, and an I/O expansion terminator 599 connected to the second I/O expander 500B.

The I/O expansion terminator 599 is a hardware component that indicates to an I/O expander 500 that no further I/O expanders are daisy chained thereto. The I/O expansion terminator 599 may be a peripheral device comprised of passive components or may have electronic active components. The controller 530 of the I/O expander 500 connected to the I/O expansion terminator 599 does not forward any data to the downlink interface 520.

Figure 4:
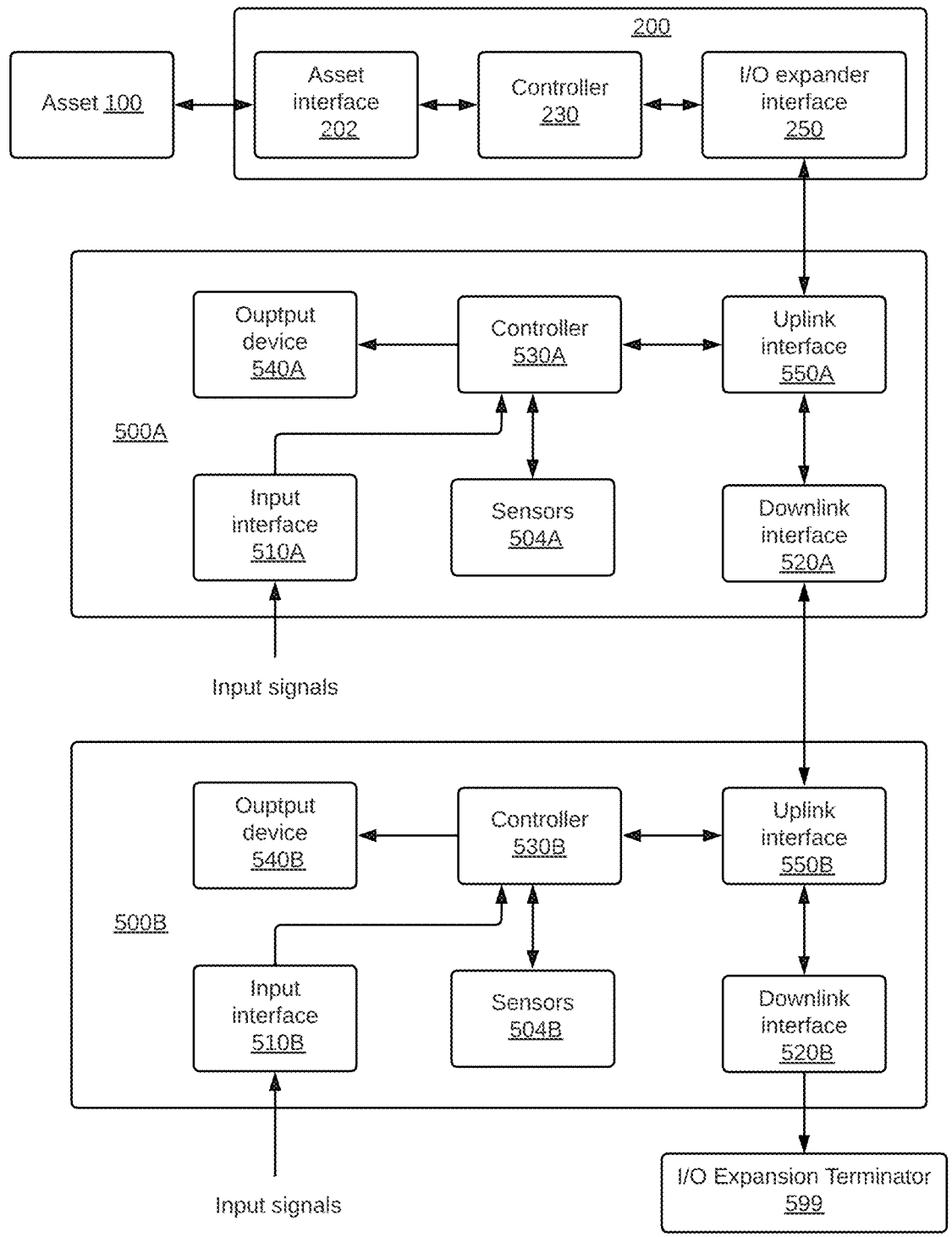
FIG. 4 is a block diagram showing a telematics device coupled to an asset and to two daisy chained I/O expanders.

Some of the components of some of the devices shown in FIG. 4 have been eliminated for the sake of simplicity. For example, the asset 100 is shown as a simple block, and only the asset interface 202, the telematics device controller 230 and the I/O expander interface 250 of the telematics device 200 are shown. The first I/O expander 500A and the second I/O expander 500B are similar to the I/O expander 500 described above with reference to FIG. 3. Accordingly, a description is not provided for any of the interfaces 510A and 5106, the controllers 530A and 530B, the sensors 504A and 504B, the outputs 560A and 560B, the uplink interfaces 550A and 550B, and the downlink interfaces 520A and 520B.

The I/O expander interface 250 of the telematics device 200 is connected to the uplink interface 550A of the first I/O expander 500A. The downlink interface 520A of the first I/O expander 500A is connected to the uplink interface 550B of the second I/O expander 500B. The downlink interface 520B of the second I/O expander 500B is connected to the I/O expansion terminator 599. Each of the first I/O expander 500A and the second I/O expander 500B may be configured as an IX device, an OX device, or an I/O expander.

Integrated Telematics Device

Figure 5:
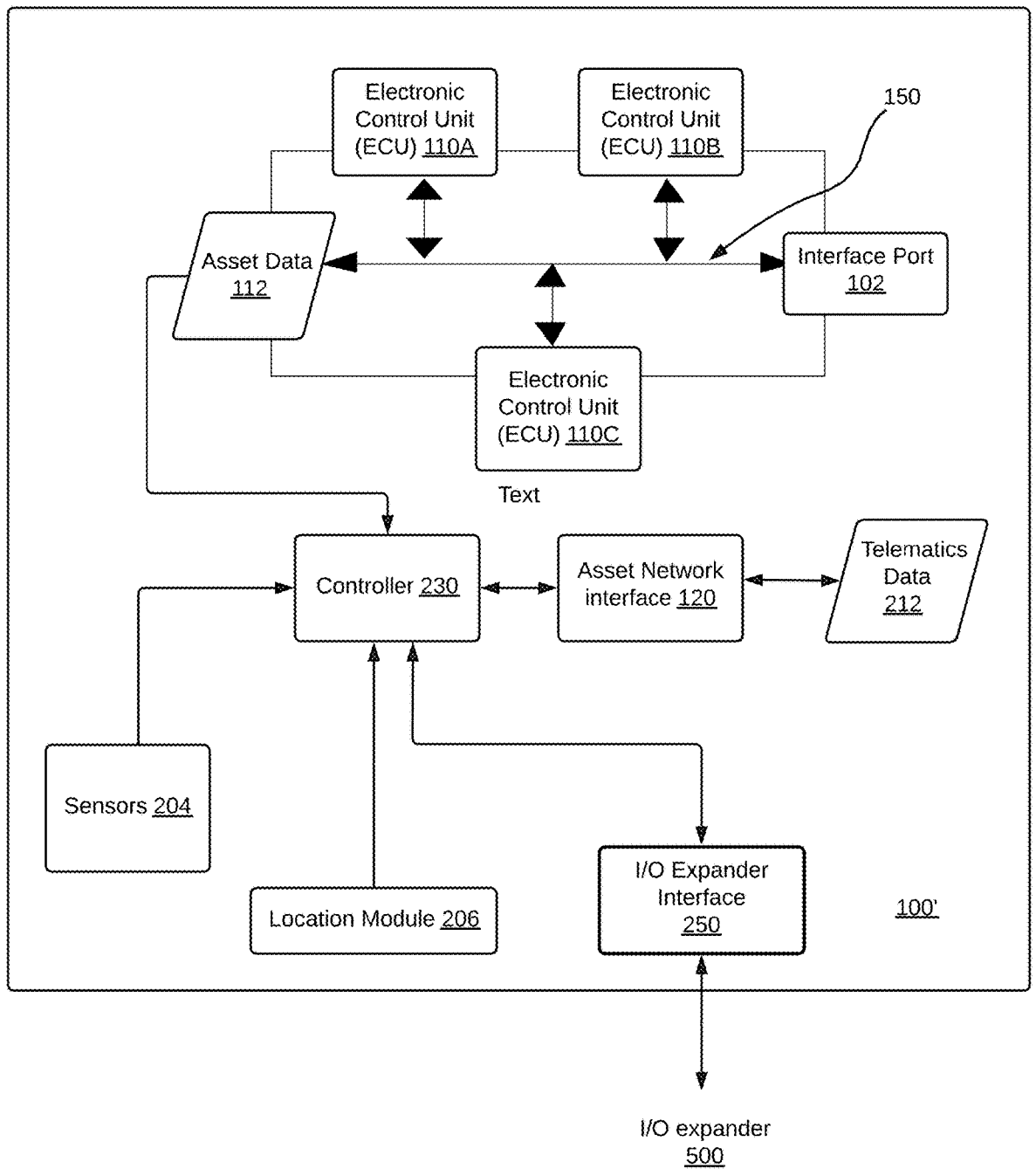
FIG. 5 is a block diagram showing an asset having a telematics device integrated therein and I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 5, there is shown an asset 100' with the components of a telematics device integrated therein, in accordance with embodiments of the present disclosure. The asset 100' is similar to the asset 100 but, being a connected asset such as a connected car, it has an asset network interface 120 built into it. In the depicted embodiment, the telematics device controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the telematics device controller 230 as described above. The asset network interface 120 belongs to the asset 100' and may be used by the asset 100 to communicate with an original equipment manufacturer (OEM) server, to a roadside assistance server, or for other purposes. The telematics device controller 230 may utilize the asset network interface 120 for the transmission of telematics data 212 provided by the telematics device controller 230. In order to support gathering data types not provided by the integrated peripherals such as the sensors 204 and the location module 206, the asset 100' has an I/O expander interface 250 coupled to the telematics device controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

As discussed above, an I/O expander 500 is connected to the telematics device 200 and may be powered by the telematics device 200 via the I/O expander interface 250. Accordingly, hardware anomalies such as power faults in the I/O expander 500 affect the operation of the telematics device 200. Among the fault conditions that the I/O expander 500 may experience are overcurrent and overvoltage conditions.

An overcurrent is a condition which exists in an electric circuit when the normal load current is exceeded, potentially causing damage to electronic components. When an overcurrent condition is detected by the I/O expander interface 250, it indicates that the I/O expander 500 connected to the I/O expander interface 250 is experiencing an overcurrent condition. If the overcurrent conditions persist, some of the components of the I/O expander 500 may be damaged. Since the I/O expander 500 is connected to the telematics device 200, an overcurrent condition in the I/O expander 500 may in some cases cause excessive current to be drawn from the telematics device 200 thus causing an overcurrent condition in the telematics device 200 as well.

An overvoltage is voltage in excess of the normal operating voltage of a device or a circuit potentially causing damage to at least some electric components in the device or circuit. An overvoltage condition detected on the I/O expander interface 250 is an indication of an overvoltage condition in the I/O expander 500 connected to the I/O expander interface 250. If the overvoltage condition is allowed to persist, component damage may take place in the I/O expander 500.

When either an overcurrent condition or an overvoltage condition affects the telematics device 200, the power fault condition must be handled before the I/O expander 500 and/or telematics device 200 incur any damage. Power fault protection modules may detect and report power fault conditions that take place in an electrical system or in a component. As such, the I/O expander interface 250 is provided with at least one power protection module as will be described below.

A power protection module may detect power faults and report such power faults to the telematics device 200. The telematics device 200 may respond to the power faults by powering off the I/O expander interface 250 altogether. Power faults may, however, be transient. As such, permanently powering off the I/O expander interface 250 may be an excessive measure as the functionality of the I/O expander 500 may be lost unnecessarily if the power fault is a transient or temporary fault.

The inventor has investigated the handling of many transient power faults detected on an I/O expander interface 250. The inventor has discovered that some transient power faults may be handled by powering off the I/O expander interface 250 and powering the I/O expander interface 250 back on after a brief duration power off. The I/O expander interface 250 and the attached I/O expander 500 may recover from certain power faults when the I/O expander interface 250 is powered off for a certain duration, then powered back on. The inventor has discovered that the power off duration that causes an I/O expander 500 to recover from a power fault varies depending on the type of I/O expander 500 connected to the I/O expander interface 250 and depending on the nature of the power fault. The inventor has discovered that increasing the power off duration causes more I/O expanders 500 to recover from power faults.

The inventor has also discovered that increasing the power off duration has diminishing returns at some power off value. Beyond that power off value, any I/O expanders that do not recover from their power faults are characterized by permanent power faults. In such cases, the I/O expanders 500 require repair or replacement. Accordingly, the best course of action is to power off the I/O expander interface 250 so that the telematics device 200 is not damaged by the effect of the power faults.

The inventor has also discovered that repeatedly powering off and powering on some I/O expanders 500, particularly I/O expanders 500 having overcurrent conditions may cause component damage in the I/O expanders 500 if done an excessive number of times. Accordingly, the number of times an I/O expander interface 250 is power cycled needs to be limited.

In one aspect of the present disclosure, a method for handling power faults on an I/O expander interface may involve power cycling the I/O expander interface with progressively increasing power off durations. After each power cycling, the power fault condition is re-checked. If the power fault condition is still detected after the power off duration has reached an upper limit, the telematics device powers off the I/O expander interface.

Progressively increasing the power off durations not only ensures that different power off durations are tested, but it also ensures that the number of power cycling events applied to an I/O expander are limited since the upper duration limit is reached sooner.

In some embodiments, the telematics device 200 does not power the I/O expander interface 250 back up until the I/O expander 500 is unplugged therefrom. For example, when telematics device 200 permanently powers off the I/O expander interface 250 the telematics device 200 stores an indication in persistent storage indicating that the I/O expander interface has been powered off due to a power fault condition. When the telematics device 200 is restarted or power cycled upon boot up the telematics device 200 checks for the indication in persistent storage and if the indication is set, the I/O expander interface 250 is only powered on if the telematics device 200 detects that no I/O expander 500 is connected thereto.

The aforementioned methods for handling a power fault on the I/O expander interface can be carried out by a telematics device 200 as described below.

Figure 6:
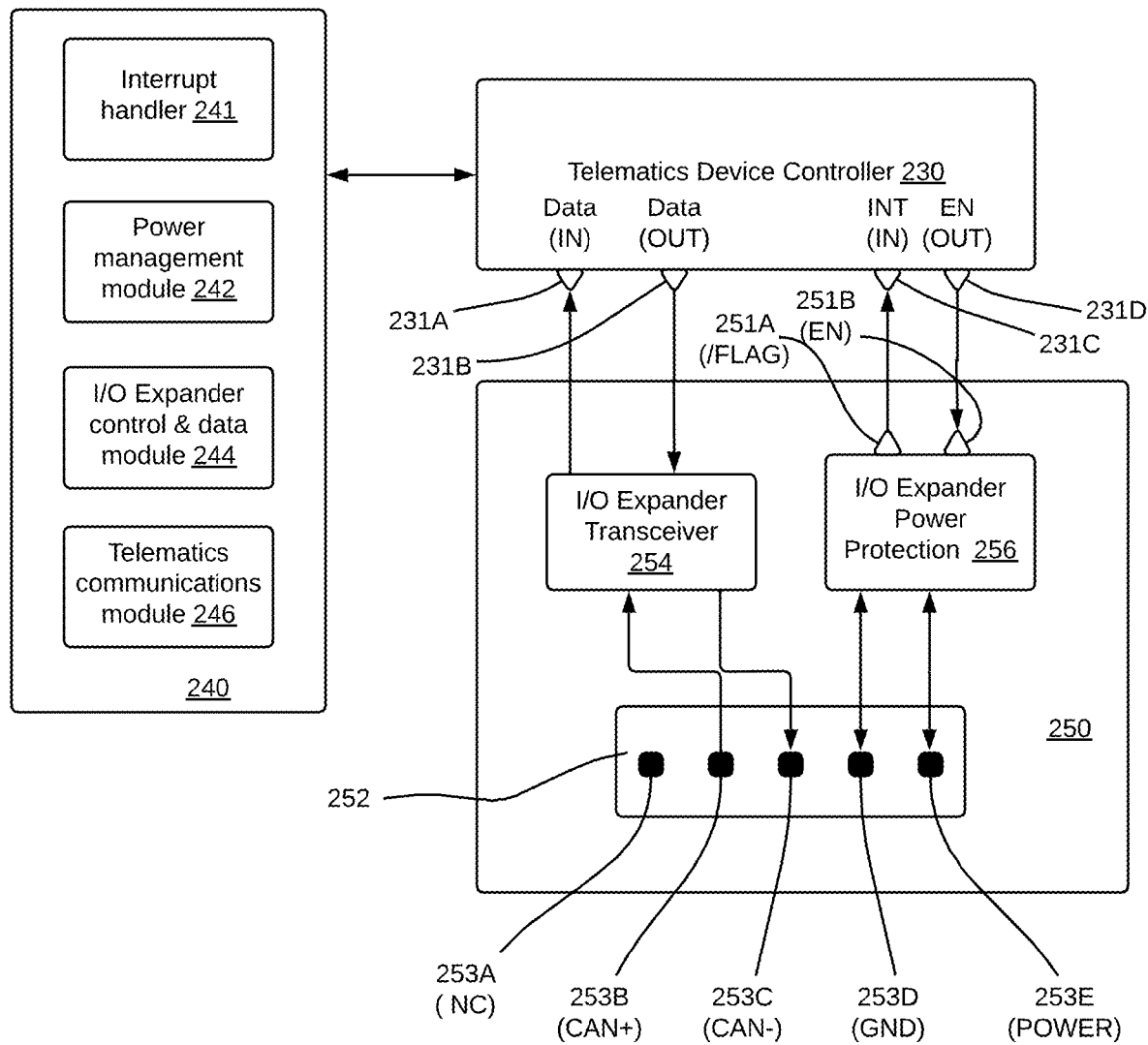
FIG. 6 is a block diagram showing selected components of a telematics device pertaining to power protection management.

FIG. 6 shows selected components of the telematics device 200, similar to the telematics device of FIG. 2 but with emphasis on the I/O expander interface 250 and the various modules and components of the telematics device 200 that allow handling power faults in an I/O expander 500 connected to the telematics device 200 via the I/O expander interface 250. Accordingly, other components of the telematics device 200 are not shown for clarity. Furthermore, the telematics device controller 230 and the memory 240 are similar to the telematics device controller 230 and the memory 240 of FIG. 2, but are shown with more detail as appropriate to carry out the methods described herein.

The telematics device controller 230 is shown with a number of pins 231A, 231B, 231C and 231D. While a skilled person would understand that a telematics device controller 230 would have additional pins with various functions, the additional pins have been omitted for clarity. The pin 231A may be a general-purpose input/output (GPIO) pin configured in input mode to receive serial I/O expander data from the I/O expander interface 250. The pin 231B may also be a GPIO pin but configured in output mode to send serial I/O expander data to the I/O expander interface 250. The pin 231C may be an interrupt pin. Logic changes detected on the pin 231C generate an interrupt within the telematics device controller 230. The pin 231D may be a GPIO pin configured as an output pin. The pin 231D is configured as a power output control pin for controlling the power provided by the telematics device 200 to an I/O expander connected to the telematics device 200 via the I/O expander interface 250.

The memory 240 of the telematics device 200 is shown containing a number of firmware modules which may configure the telematics device for carrying out the methods for handling power faults on the I/O expander interface. For example, the memory 240 is shown storing an interrupt handler 241, a power management module 242, an I/O expander control and data module 244, and a telematics communications module 246. It would be apparent to those of skill in the art that other software modules may also be stored in the memory 240 but are not shown for the sake of simplicity. For example, the memory 240 may store modules for reading and processing sensor data and location data. The memory 240 may store a kernel module or other telematics applications. In some embodiments, some, or all of the firmware modules shown may be stored in an internal memory of the telematics device controller 230 instead of in the memory 240.

The interrupt handler 241 is executed, by the telematics device controller 230, in response to an event that is configured to generate an interrupt. A logic change detected on the interrupt pin 231C constitutes an event which may cause an interrupt, which in turn causes the interrupt handler 241 to be executed. For example, the interrupt handler 241 may be executed when the signal detected at the interrupt pin 231C changes from logic HIGH to logic LOW, or vice versa. The mechanism by which the interrupt handler 241 is caused to execute is implementation-defined. By way of example, the telematics device controller 230 may have an interrupt vector that may be assigned the starting address of the interrupt handler 241. Accordingly, when the interrupt is triggered, the telematics device controller 230 jumps to the starting address of the interrupt handler 241 causing the interrupt handler 241 to execute. The interrupt handler 241 may notify the power management module 242 that a power fault protection event has been detected as will be described below.

The power management module 242 contains machine-executable programming instructions which, when executed by the telematics device controller 230, configure the power condition of the I/O expander 500. For example, the power management module 242 may include instructions which cause the telematics device controller 230 to power off the I/O expander 500 by configuring the I/O expander interface 250 accordingly. Conversely, the machine-executable instructions may cause the telematics device controller 230 to power up the I/O expander 500 by configuring the I/O expander interface 250 accordingly.

The I/O expander control and data module 244 includes machine-executable programming instructions which, when executed by the telematics device controller 230, configure the telematics device 200 to exchange data and control signals with the I/O expander 500. For example, signals received at the input pin 231C are processed by the I/O expander control and data module 244. The received signals may comprise data provided by the I/O expander 500, or commands sent by the I/O expander 500 to the telematics device 200 requesting information. The I/O expander control and data module 244 also includes machine-executable programming instructions which send signals to the pin 231D to be sent to an I/O expander via the I/O expander interface 250. The signals may comprise I/O expander data, commands, or status information to be processed by the I/O expander.

The telematics communications module 246 includes machine-executable programming instructions which, when executed by the telematics device controller 230, configures the telematics device to communicate with the telematics server 300 over the network interface 220. The telematics communications module 246 may send telematics data 212 including I/O expander data 512 to the telematics server 300. The telematics communication module 246 may receive requests or commands, from the telematics server 300, to capture I/O expander data. In response, the telematics communication module 246 may direct the I/O expander control and data module 244 to issue commands to the I/O expander 500, over the I/O expander interface 250, to capture the requested I/O expander data. In some embodiments, the telematics communication module 246 may receive an indication, from the power management module 242, that a power fault condition has been detected over the I/O expander interface 250. In response to receiving the indication, the telematics communications module 246 may send an indication to the telematics server 300 notifying the telematics server 300 that the I/O expander data requested by the telematics server 300 may be delayed due to the power fault condition. In some embodiments, the telematics communications module 246 may receive an indication from the power management module 242 that the I/O expander interface 250 has been permanently powered off due to a power fault condition. In response, the telematics communications module 246 may send an indication to the telematics server 300 that any requested I/O expander data will not be delivered to the telematics server 300 as a result of a power fault condition with the I/O expander 500.

In some embodiments, the pin 231C is a GPIO pin configured in input mode, there is no interrupt handler 241, and the power protection management model monitors the logic level changes on the input pin 231C by polling either continuously or at certain intervals.

The I/O expander interface 250 is comprised of an I/O expander hardware port 252, an I/O expander transceiver 254, and an I/O expander power protection module 256. The I/O expander hardware port 252 includes a plurality of pins 253 for connecting to an I/O expander 500. The I/O expander transceiver 254 connects the I/O expander hardware port 252 to the telematics device controller 230. The I/O expander power protection module 256 is connected to the I/O expander hardware port 252 for providing protection against faults.

The I/O expander hardware port 252 may comprise a plurality of pins 253 for interfacing to an I/O expander 500. In the depicted embodiment, the I/O expander hardware port 252 has 5 pins, which are labeled as pin 253A through pin 253E. The I/O expander hardware port 252 may be a mini-USB connector, a micro-USB connector, a USB-C connector, an RS-232 connector, an Ethernet connector, an RJ45 connector, or any suitable type of hardware connection that allows an external I/O expander to couple thereto. In a non-limiting example, the I/O expander interface port is a CAN bus, and the I/O expander hardware port 252 uses four pins for the signals CAN+, CAN−, GND, and POWER. Table 1 shows an example of pin mapping of an I/O expander hardware port 252 using a mini-USB B-type connector and using four pins of the 5 pins thereof for the CAN+, CAN−, GND, and POWER signals.

TABLE 1

| I/O expander hardware port pins | | |
|---|---|---|
| Pin No. | Name | I/O |
| 253A | NC | NC |
| 253B | CAN+ | IO |
| 253C | CAN− | IO |
| 253D | GND | GND |
| 253E | BATT_IOX | POWER |

The pin 253A is not connected (NC). The pin 253B and the pin 253C are the I/O expander data pins of the CAN bus. The pin 253B allows the transmission of serial data to an I/O expander 500 connected to the I/O expander hardware port 252. Conversely, the 253C pin allows the reception of serial data from an I/O expander connected to the I/O expander hardware port 252. The pin 253D is the ground (GND) pin and the power pin 253E is the power (POWER) pin providing electric power from the telematics device 200 to an I/O expander 500 connected to the I/O expander interface 250. The POWER pin is also denoted BATT_IOX in the figure.

The I/O expander transceiver 254 converts signals on the I/O expander hardware port 252, such as the CAN+ and CAN− signals, to signal levels that are understood by the telematics device controller 230, and vice versa. For example, on a CAN bus the CAN− signal is 1.5V while the CAN+ signal is 3.5V. The telematics device controller 230 may use transistor-to-transistor logic (TTL) or complementary metal oxide semiconductor (CMOS) signals which are typically 0V for a low logic value and 5V for a high logic value. The I/O expander transceiver 254 converts output signals from the telematics device controller 230 to CAN signal levels and converts input signals from the I/O expander data pin 253B and data pin 253C to TTL or CMOS signal levels, so that they can be connected to the pin 231A and the pin 231B of the telematics device controller 230.

The I/O expander power protection module 256 is an electronic module providing protection to a load device against certain fault conditions. Among the fault conditions that the I/O expander protection module protects against are overcurrent and overvoltage conditions. An overcurrent is a condition which exists in an electric circuit when the normal load current is exceeded, potentially causing damage to electronic components. Overcurrent protection is, therefore, protection against excessive currents or current beyond the acceptable current rating of equipment. An overvoltage is voltage in excess of the normal operating voltage of a device or a circuit potentially causing damage to at least some electric components in the device or circuit. Overvoltage protection protects against overvoltage. An undervoltage condition occurs when voltage drops below the operational value. When system voltage drops below the operational value, some electronic components may stop working altogether while others may not operate correctly. To protect against undervoltage conditions, an undervoltage-lockout (UVLO) circuit may be deployed. A UVLO is an electronic circuit used to turn off the power of an electronic circuit in the event of the voltage dropping below the operational value. A power protection module which protects against overcurrent and overvoltage conditions in a load circuit, protects the load circuit by disconnecting electric power upon detection of the overcurrent or overvoltage condition. A power protection module which additionally protects against undervoltage conditions contains a UVLO. Power protection modules are sometimes referred to as electronic fuses or eFuses.

Another fault condition that may also occur in some electronic devices includes a reverse current condition. Reverse current is the flow of direct current (DC) in a reverse direction or of an alternating current (AC) in phase opposition to the normal phase. In a DC circuit, if voltage on an output pin (VOUT) is higher than a voltage on an input pin (VIN), reverse current may flow from VOUT to VDD. A reverse current protection circuit stops the reverse current from VOUT to VDD when VOUT is higher than VIN. Some power protection modules may, in addition to providing overcurrent and overvoltage protection, provide protection against reverse current conditions.

Yet another fault condition that may take place in some electronic devices or circuits is thermal overheating. Some electronic chips may experience an excessive rise in their temperature and need to be shut down to prevent their degradation. The rise in temperature of the chip may be caused by a shorted load, an output-to-ground short circuit, a rise in ambient temperature or self-heating. A power protection module may also provide thermal shutdown functionality by monitoring the chip temperature of a lower dropout (LDO) regulator and turn off its output to prevent chip degradation or destruction in the event of excessive rise in the chip's temperature.

The I/O expander power protection module 256 of a telematics device 200 provides at least one of: overvoltage protection, overcurrent protection, reverse current protection, and thermal shutdown functions for an I/O expander 500 connected to the telematics device 200. One example of the I/O expander power protection module 256 includes the MAX14571, the MAX14572, and the MAX14573 adjustable overvoltage and overcurrent protectors from MAXIM™. Another example of the I/O expander power protection module 256 includes the TPS1663x 50-V, 5-A eFuse from Texas Instruments™. The I/O expander power protection module 256 connects to ground pin 253D and the power pin 253E of the I/O expander hardware port 252 allowing the I/O expander power protection module 256 to detect and protect against overvoltage, overcurrent, and reverse current conditions. The I/O expander power protection module 256 also includes a built-in overtemperature shutdown circuitry. The I/O expander power protection module has an enable pin 251B which is connected to the telematics device controller 230. The enable pin can be asserted HIGH to enable the I/O expander power protection module 256 to provide power from the telematics device 200 to the I/O expander 500 via the power pin 253E and the ground pin 253D. Conversely, the enable pin 251B can be de-asserted LOW to configure the I/O expander power protection module 256 not to provide power from the telematics device 200 to the I/O expander 500. The I/O expander power protection module has a flag (FLAG) pin 251A which is also connected to an input pin of the telematics device controller 230. In one embodiment, the FLAG pin 251A is connected to an interrupt pin of the telematics device controller 230. Accordingly, an interrupt signal generated by the flag pin 251A is detected at an interrupt pin 231C of the telematics device controller 230. In another embodiment, the FLAG pin 251A is connected to a general-purpose input/output (GPIO) pin of the telematics device controller 230, wherein the GPIO pin is configured as an input pin. The flag pin 251A may be an active-low pin or an active-high pin. For example, if the flag pin is an active-low pin, it is referred to as the /FLAG pin. The /FLAG pin 251A is HIGH when the I/O expander power protection module 256 does not detect any fault conditions in the I/O expander 500.

Assuming an I/O expander is connected to the telematics device 200, as discussed earlier with reference to FIG. 3, under normal operation the telematics device 200 powers up the I/O expander and exchanges data and commands therewith. Specifically, the power management module 242 configures the telematics device controller 230 to assert the signal on the pin 231D. Asserting the signal on the pin 231D causes the enable pin 251B of the I/O expander power protection module 256 to be asserted. In response, the I/O expander power protection module 256 enables electric power to be provided to the I/O expander via the power pin (253E) and the ground pin 253D of the I/O expander hardware port 252. Under normal operation the /FLAG pin is HIGH indicating that no power faults have been detected by the I/O expander power protection module 256. As a result of the /FLAG being set to HIGH, no interrupt signal is detected at the interrupt pin 231C of the telematics device controller 230. Additionally, under normal operation, the I/O expander control and data module 244 runs and executes machine-executable programming instructions which cause the telematics device controller 230 to exchange I/O expander data, control and status with the I/O expander via the pins 231A and 231B, which are connected, via the I/O expander transceiver 254, to the CAN+ (I/O expander data pin 253B) and CAN− (I/O expander data pin 253C) pins on the I/O expander hardware port 252.

When any power fault condition, such as an overvoltage condition, an overcurrent condition, a reverse-current condition, or an overheating condition occurs in the I/O expander 500, the condition is detected by the I/O expander power protection module 256. In some embodiments, in response to detecting the power fault, the I/O expander power protection module 256 shuts down the power provided to the I/O expander 500, via the ground pin 253D and the POWER pin 253E. Additionally, the I/O expander power protection module 256 signals the telematics device controller 230 of the detected condition and corresponding shutdown. In the example shown the I/O expander power protection module 256 de-asserts the /FLAG pin. In some embodiments, the /FLAG pin is connected to the interrupt pin 231C on the telematics device controller 230, the telematics device controller 230 senses an interrupt signal on the interrupt pin 231C and generates an interrupt which is handled by the interrupt handler 241. In some example embodiments, the telematics device 200 uses a bare metal system and the interrupt handler 241 updates the power status of the I/O expander while the power management module 242 periodically checks that status. In another example embodiments, the telematics device 200 users an embedded kernel, and the interrupt handler 241 sends a message to the power management module 242 which in this case is running as a task controlled by the kernel. The power management module 242 handles the power protection fault condition. In some embodiments, the power management module 242 polls the /FLAG pin and sends a signal change on the /FLAG pin from HIGH to LOW thus indicating a power fault.

One approach to handling a power protection fault condition is to power off the faulty module that has a power fault, wait for a period of time, then attempt to power the faulty module back up. For example, in response to detecting a power fault, the power management module 242 may keep the I/O expander interface 250 powered off for a power-off duration, then power back the I/O expander interface 250 on for a power-on duration. For example, upon determining that a power protection fault condition has been detected (which is also accompanied by the I/O expander power protection module 256 powering off the I/O expander interface 250) the power management module 242 may start a timer for 500 ms. Upon the expiry of the timer, the power management module 242 may power up the I/O expander interface 250 for 1000 ms. Upon powering up the I/O expander interface 250, which also powers up the I/O expander 500 that encountered the power protection fault condition, a number of possible outcomes may arise. In some instances, the I/O expander 500 powers up correctly and the power protection fault indication is cleared at the I/O expander interface 250. For example, the I/O expander power protection module does not detect any power faults on the I/O expander interface and asserts the /FLAG signal indicating that there are no power faults. As a result of the power fault indication being cleared, the power management module 242 keeps the I/O expander power protection module 256 configured to provide electric power to the I/O expander. Accordingly, the I/O expander 500 remains powered on and functioning normally. In other instances, a power protection fault condition takes place again at the I/O expander interface 250 in response to being powered back on after the power off duration. In this case, power management module 242 may repeat the aforementioned steps. The power management module 242 may power off the I/O expander for a power-off duration (such as 500 ms) and then power it back on for a power-on duration (such as 1000 ms).

While the above-described steps work for some I/O expanders, they may cause problems with other I/O expanders. For example, repeatedly powering up an I/O expander that has an overcurrent condition means that the overcurrent condition is recurring frequently, and the excessive current may start damaging components on the I/O expander and/or in the I/O expander power protection module 256. Accordingly, as discussed above, the number of times an I/O expander is power cycled needs to be limited.

Figure 7:
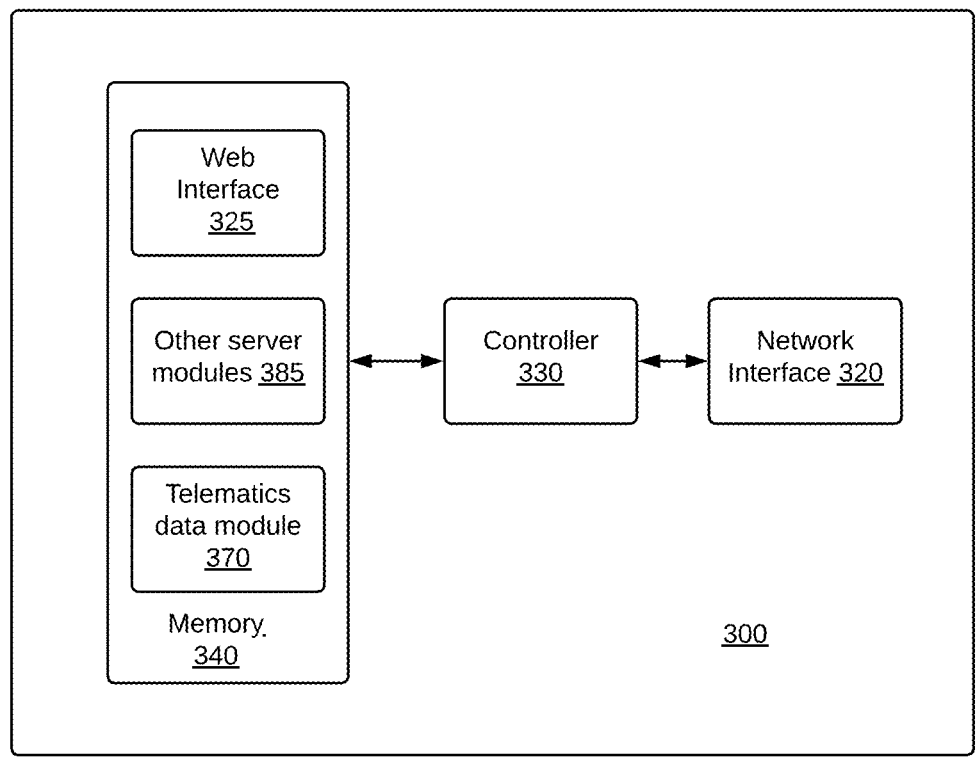
FIG. 7 is a flow chart depicting a method for handling power faults in an I/O expander bus of a telematics device, in accordance with an embodiment of the present disclosure.

In some cases, when an I/O expander interface 250 is powered off and accordingly the I/O expander 500 connected thereto is powered-off, I/O expander data requested by the telematics server 300 cannot be delivered. A brief description of the telematics server 300 is provided with reference to FIG. 7. The telematics server 300 has a controller 330, a memory 340, a network interface 320 and a web interface 325.

The controller 330 is generally speaking a microprocessor such as ones used in personal computers, laptop computers, but likely more powerful. the controller 330 executes machine-executable programming instructions stored in the memory 340 to carry out some of the steps of the methods described herein.

The memory 340 is similar to the memory 240 of the telematics device 200 and contains software modules for performing some steps of the methods described herein. In the depicted embodiment, the memory 240 is shown containing a telematics data module 370, a web interface 325, and other server modules 385.

The telematics data module 370 may process the telematics data 212 received from a telematics device 200 and perform data analysis thereon. The telematics data module 370 may also request the telematics data 212 including I/O expander data from a telematics device 200 coupled to an I/O expander 500.

The web interface 325 may allow a fleet manager 20 using an administrative terminal 400 to access data and analytics from the telematics server 300.

The other server modules 385 represent other functions of the telematics server 300 such as data processing, networking, and database management.

Figure 8:
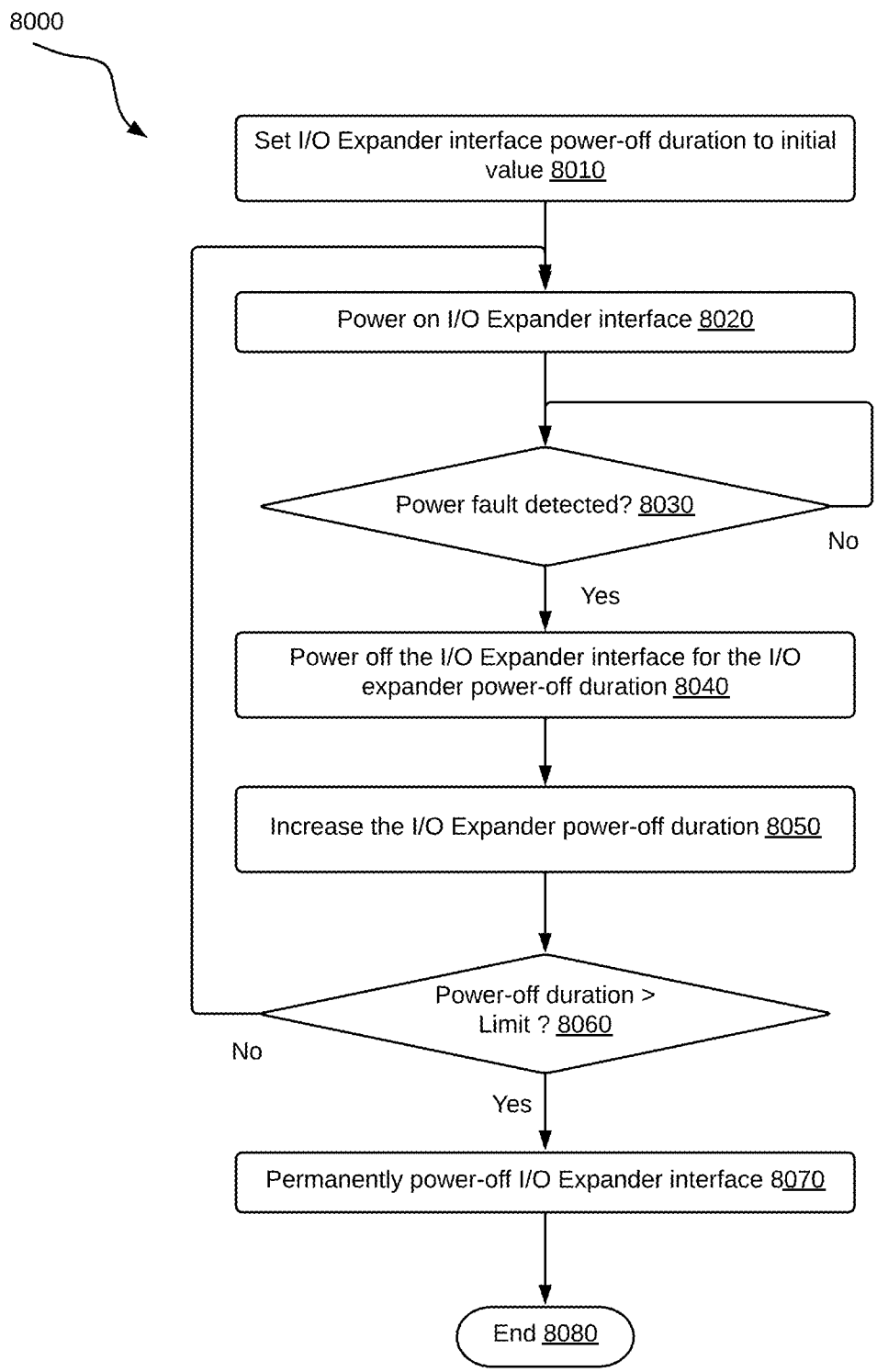
FIG. 8 is a block diagram showing components of a telematics server, in accordance with embodiments of the present disclosure.

FIG. 8 depicts a method 8000 for handling power protection fault conditions in an electronic device, such as the telematics device 200, wherein the telematics device 200 includes an I/O expander interface 250 and the power protection fault condition occurs in the I/O expander interface 250.

At step 8010, an I/O expander interface power-off duration is set to an initial value. The I/O expander interface power-off duration value determines the duration that the I/O expander interface is powered-off for when a power protection fault is initially detected by the I/O expander power protection module 256 and reported to the power management module 242 as discussed above. The initial value of the I/O expander interface power-off duration is relatively short. For example, the initial value of the I/O expander interface power-off duration may be set to 500 ms (0.5 second).

At step 8020, the power protection management module powers up the I/O expander interface 250, thus causing an I/O expander 500 connected thereto to be powered up. In some embodiments, the telematics device 200 is powered up and detects that an I/O expander 500 is connected to the I/O expander interface 250 and hence the telematics device 200 powers up the I/O expander interface 250. In other embodiments, the step 8020 may be performed when an I/O expander 500 is connected to the I/O expander interface 250 while the telematics device 200 is already powered up.

At step 8030 the I/O expander power protection module 256 checks whether a power protection fault has occurred on the I/O expander interface. As discussed earlier, this may entail the power management module 242 polling an input pin connected to the power protection fault flag pin of a power protection module, waiting for an interrupt, or waiting for a kernel message indicating the power protection fault condition. If no power protection fault indication is received, the I/O expander interface 250 remains in the powered-up state and continues normal operation. In other words, control remains at step 8030 as long as the answer to the question "power fault detected?" is "no". If, however, at step 8030, a power protection fault condition is detected, then control goes to step 8040.

At step 8040 the I/O expander interface 250 is powered off for a period determined by the I/O expander interface power-off duration. Typically, the I/O expander interface is powered off by the I/O expander power protection module 256. The power management module 242 may start a timer with an expiry time equal to the I/O expander interface power-off duration. In some embodiments, the I/O expander power protection module may provide an indication of the power fault only. In this case, the power management module 242 may use the pin 231D to instruct the I/O expander power protection module 256 to power-off the I/O expander interface before starting the timer. When the timer expires, control goes to step 8050. In some embodiments, the telematics device controller 230 may be executing other machine-executable programming instructions while the timer is running. Then upon expiry of the timer, a timer expiry interrupt is signaled, and step 8050 is executed in response to the timer expiry interrupt.

In some embodiments, the telematics device 200 has received a request for I/O expander data from a telematics server 300. In such embodiments, at step 8040, the telematics communications module 246, may send an indication to the telematics server 300 to retry sending the request after the I/O expander interface power-off duration. Advantageously, the telematics server 300 does not repeatedly send requests for the I/O expander data while the I/O expander interface is powered-off. This reduces network traffic and processing resources on the telematics server 300.

At step 8050, the I/O expander interface power-off duration is increased. The purpose of increasing the power-off duration is to give the components of the I/O expander interface and the I/O expander additional time between powered-on states. For example, if the I/O expander interface has undergone a thermal shutdown, the increase in the I/O expander interface power-off duration allows overheated components to cool off. Additionally, if there is an overvoltage or overcurrent condition, increasing the power-off duration between two successive power-on conditions, causes less overvoltage and/or overcurrent to pass through the components thus reducing the likelihood of damage. In some embodiments, the I/O expander interface power-off duration is increased by a percentage such as 50%. In other embodiments, the I/O expander interface power-off duration is doubled. In other embodiments, the I/O expander interface power-off duration is quadrupled. Various tests have been conducted and it has been observed that better results are achieved when the I/O expander interface power-off duration is quadrupled at step 8050. If the initial I/O expander interface power-off duration was 0.5 seconds, then at step 8050, the I/O expander interface power-off duration may become 2 seconds.

At step 8060, the I/O expander interface power-off duration is checked against an I/O expander interface power-off duration limit. The inventor has found, through various testing, that an I/O expander or an I/O expander interface which does not recover from their power fault conditions after a number of power cycling iterations rarely recover. These I/O expanders or I/O expander interfaces typically have a permanent hardware problem that needs repair and cannot be addressed solely by power cycling. It has been observed that once the power-off duration is extended to a particular duration limit, further power cycling of the I/O expander interface 250 does not cause the I/O expander 500 to recover from the power fault condition. In some devices, an I/O expander interface 250 power-off duration limit of 128 seconds has been shown to address the majority of recoverable power fault conditions. In other devices an I/O expander interface power-off duration limit of 512 seconds has been shown to address the majority of recoverable power fault conditions. At step 8060, if the I/O expander interface power-off duration is still less than the I/O expander interface power-off duration limit then control goes back to step 8020, where the I/O expander interface is powered-on as before. If, at step 8030 a power fault condition is detected, then the I/O expander interface is powered off, at step 8040, but this time using the newer I/O expander interface power-off duration which has just been increased at the previous instance of step 8050. It should be noted that step 8030 takes place a period of time equal to a power-on duration after step 8020. In some instances, the I/O expander 500 needs time to be fully powered on before any power fault conditions are detected.

The steps 8020 to 8060 are repeated until one of two conditions is satisfied. The first condition is when, at step 8030, a power fault condition is not detected and the I/O expander interface 250 remains power-on and operating normally. The second condition is when, at step 8060, the I/O expander interface power-off duration exceeds the I/O expander interface power-off duration limit. In this case, control goes to step 8070.

At step 8070, the power management module 242 permanently powers-off the I/O expander interface 250. This represents a recognition that further power cycling of the I/O expander interface for a longer I/O expander interface power-off duration, is unlikely to cause the I/O expander interface or an I/O expander 500 connected thereto to recover from the power fault conditions which were detected throughout the previous iterations of the method. Permanently powering off the I/O expander interface 250 may also advantageously prevent components of the I/O expander 500 from being damaged due to repeated powering on the I/O expander 500 while it may have an overcurrent condition. In some embodiments, at step 8070, the telematics communications module 246 may send an indication to the telematics server 300 indicating that the I/O expander connected to the telematics device is no longer operational. In response, the telematics server may send a notification to an administration terminal 400, for example, indicating that the I/O expander associated with the telematics device 200 is malfunctioning. In another embodiment, the telematics server may refrain from further requesting I/O expander data from the telematics device, in response to receiving the notification from the telematics device 200 that the I/O expander 500 connected thereto is not working properly.

The method 8000 ends at step 8080. In some embodiments, powering off the telematics device 200 and powering it back on restarts the method 8000. In other words, the I/O expander power-off duration is reset back to its initial value (at step 8010) and the I/O expander interface is powered-up at step 8020, and the method 8000 continues as described above.

Figure 9:
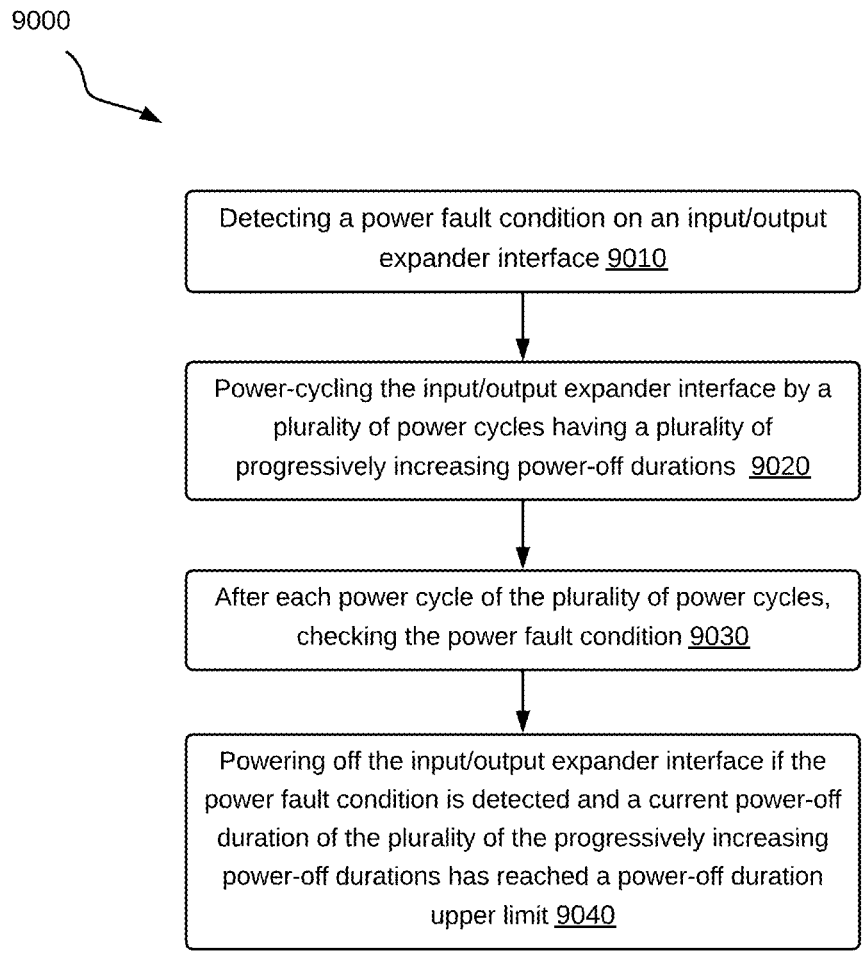
FIG. 9 is a flow chart depicting a method for handling power faults in an I/O expander bus of a telematics device, in accordance with another embodiment of the present disclosure.

FIG. 9 depicts a method 9000 of handling a power fault on an I/O expander interface, in accordance with some embodiments of the present disclosure. The method starts at step 9010.

At step 9010, the telematics device 200 detects a power fault condition on the I/O expander interface 250. For example, the telematics device controller 230 may receive an indication from the I/O expander power protection module 256 of a power fault on the I/O expander interface 250. The indication may be an interrupt event, which causes the interrupt handler 241 to be executed or a level change in the /FLAG signal indicating a power fault. The interrupt handler 241 may send an indication, such as a message to the power management module 242 indicating the power fault. Alternatively, the power management module 242 may poll the pin 251B to check for level changes on the /FLAG signal indicating a power fault on the I/O expander interface 250.

At step 9020, the telematics device 200 performs power-cycling of the input/output expander interface 250 by a plurality of power cycles having a plurality of progressively increasing power-off durations. For example, the power management module 242 may power off the I/O expander interface 250 for a few seconds and then power it back on, which constitutes a single power-cycle of the I/O expander interface. The power management module 242 may repeat the power-cycling of the I/O expander interface with an increased power-off duration. For example, the power-off duration of the second power-cycle of the I/O expander interface 250 may be double the power-off duration of the first power-cycle of the I/O expander interface 250. Accordingly, the plurality of power cycles of the I/O expander interface have progressively increasing power-off durations.

The telematics device 200 checks the power fault condition after each power cycle of the plurality of power cycles, as stated in step 9030. For example, after the power management module 242 has turned off the I/O expander interface and turned it back on, the power management module 242 may check if the power fault is still in effect. In some embodiments, the power management module 242 may receive a new message from the interrupt handler 241 indicating that the power fault has re-occurred. Alternatively, the power management module 242 may cause the telematics device controller 230 to poll the /FLAG signal to check whether it indicates a power fault on the I/O expander interface 250.

At step 9040, the telematics device 200 powers off the I/O expander interface 250 if the power fault condition is detected and the power-off duration of the current power cycle (i.e., the current power-off duration) has reached a power-off duration upper limit. In some embodiments, the power management module 242 may, upon detecting that the power fault condition is still in effect, compare the current power-off duration of the current power cycle with a power-off duration upper limit. If the current power-off duration is greater than the power-off duration upper limit, then power management module 242 powers down the I/O expander interface 250 permanently. The check as to whether the current power-off duration is greater than the power-off duration upper limit is done after each power cycle of step 9020.

Figure 10:
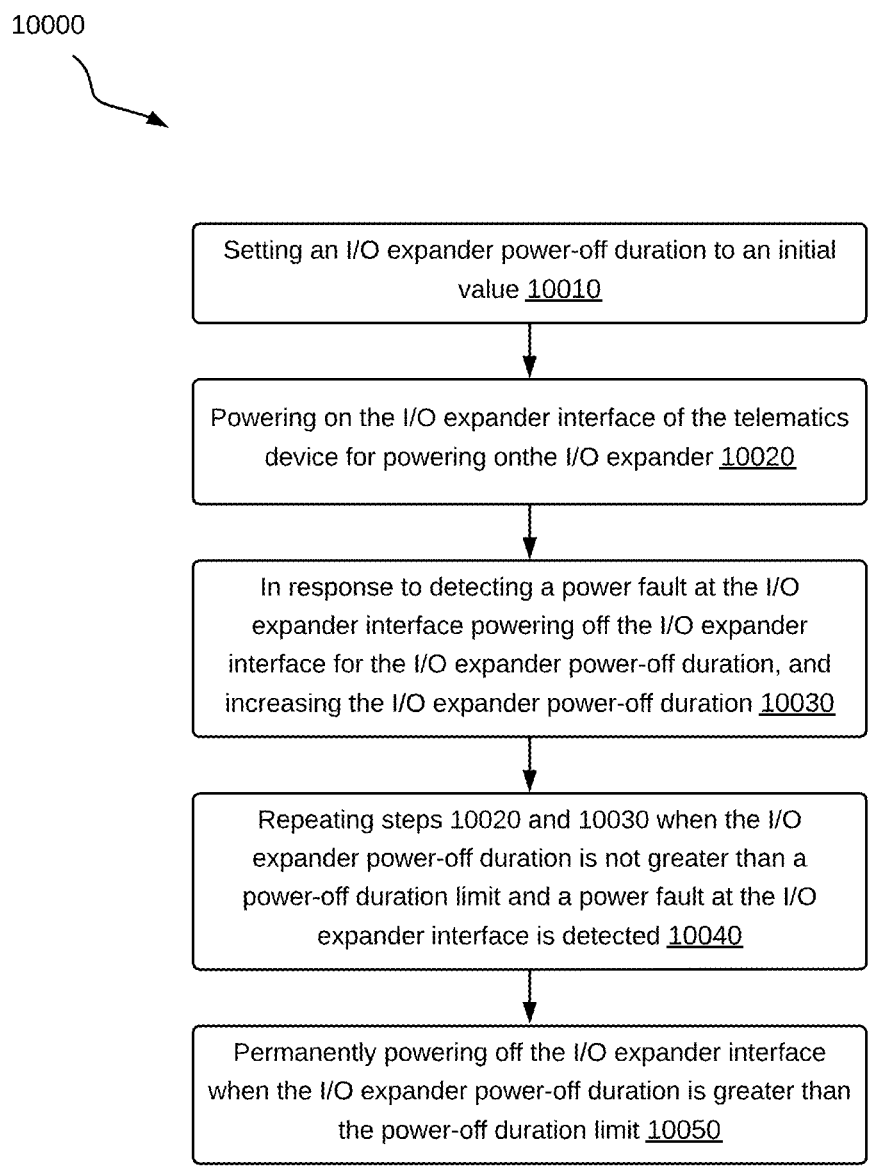
FIG. 10 is a flow chart depicting a method for handling power faults in an I/O expander bus of a telematics device, in accordance with yet another embodiment of the present disclosure.

FIG. 10 depicts a method 10000 of handling power faults on an I/O expander interface, in accordance with embodiments of the present disclosure. At step 10010, the telematics device 200 sets an I/O expander power-off duration to an initial value. For example, the power management module 242 may set an initial I/O expander power-off duration to 10 seconds. The I/O expander power-off duration may be used in case of a power fault as will be described in subsequent steps of the method 10000. Step 10010 may be carried out when the telematics device 200 is first powered-up or rebooted.

At step 10020, the telematics device 200 powers up the I/O expander interface. This step may be carried out when the telematics device 200 is first powered up or rebooted. The power management module 242 may, when executed by the telematics device controller 230, assert the output pin 231D which configures the I/O expander power protection module 256 to provide power to the power pin 253E. As a result, an I/O expander connected to the I/O expander interface 250 via the I/O expander hardware port 252 will also be powered up.

At step 10030, if a power fault is detected at the I/O expander interface 250, the telematics device 200 powers off the I/O expander interface for the I/O expander power-off duration, and increases the value of the I/O expander power-off duration.

At step 10040, the steps 10020 and 10030 are repeated as long as the power fault is detected, and the value of the I/O expander power-off duration is not greater than a power-off duration limit. Since the I/O expander power-off duration is increased in step 10030, eventually the I/O expander power-off duration becomes greater than the power-off duration limit and control goes to step 10050.

As step 10050, the telematics device 200 permanently powers off the I/O expander interface 250 since the I/O expander power-off duration is greater than the power-off duration limit.

In another aspect of the present disclosure, there is provided a method by a primary electronic device for handling power faults on a secondary electronic device coupled to the primary electronic device via a hardware interface of the primary electronic device. For example, with reference to FIG. 11, there is shown a primary electronic device 1100 and a secondary electronic device 1200 coupled to the primary electronic device 1100 via a hardware interface 1150 of the primary electronic device.

Figure 11:
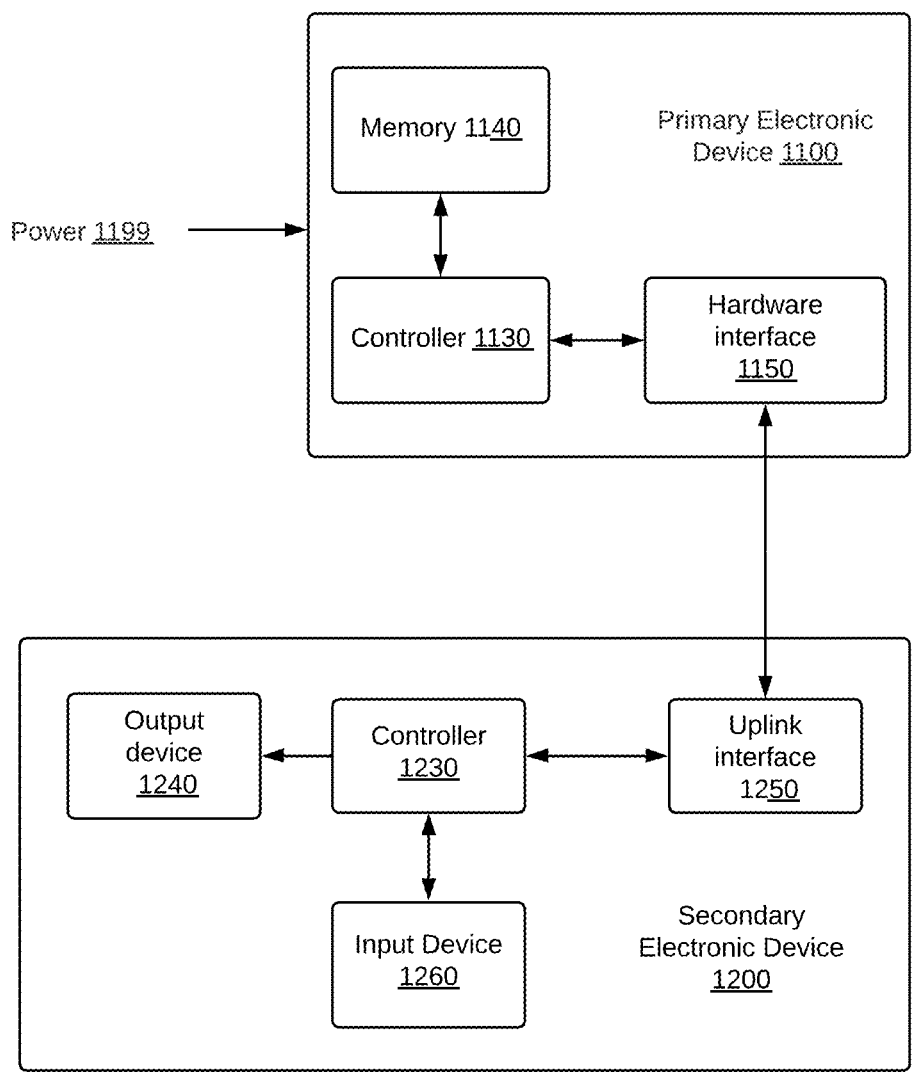
FIG. 11 is a block diagram showing a primary electronic device coupled to a secondary electronic device via a hardware interface of the primary electronic device, in accordance with embodiments of the present disclosure.

In this disclosure, a primary electronic device is an electronic device having many functions and is self-powered via an external source 1199 or a power harvesting device such as a battery or a solar panel. The primary electronic device 1100 of FIG. 11 is shown in a simplified form having only a primary electronic device controller 1130, a memory 1140, and a hardware interface 1150. However, it would be appreciated by those of skill in the art that the primary electronic device may contain more components, such as the components of the above-described telematics device 200, for example.

In this disclosure, a secondary electronic device is an electronic device that relies on a primary electronic device for power, and acts as either an input or an output device for the primary electronic device. For example, the secondary electronic device 1200 of FIG. 11 has a controller 1230, an output device 1240, an input device 1260, and an uplink interface 1250.

The primary electronic device 1100 shown has a primary electronic device controller 1130, a memory 1140, and a hardware interface 1150. The primary electronic device controller 1130 is similar to the telematics device controller 230 of the telematics device 200. The primary electronic device controller 1130 has a data input pin 1131A similar to the pin 231A of the telematics device controller 230. The data output pin 1131B is similar to the data output 231B of the telematics device controller 230. The primary device controller 1130 has an interrupt pin 1131C and an output enable pin 1131D, which are similar to the pins 231C and 231D of the telematics device controller 230, respectively.

The memory 1140 is similar to the memory 240 of the telematics device 200. The hardware interface 1150 permits the connection of a secondary electronic device to the primary electronic device 1100 therethrough. A more detailed block diagram of the primary electronic device is shown in FIG. 12 and will be discussed below.

The secondary electronic device 1200 has a controller 1230, an input device 1260, an output device 1240, and an uplink interface 1250. The controller 1230 may be similar the controller 530 of the I/O expander 500. The controller 1230 may have internal memory for storing machine-executable programming instructions for configuring the secondary electronic device 1200. The input device 1260 may represent any number of sensors, location modules, or the like that provide input to the secondary electronic device 1200. The output device 1240 may represent any number of peripherals that produce output such as speakers, motors, displays, light emitting diodes, and the like. The uplink interface 1250 connects the secondary electronic device 1200 to the hardware interface 1150 of a primary electronic device 1100.

Figure 12:
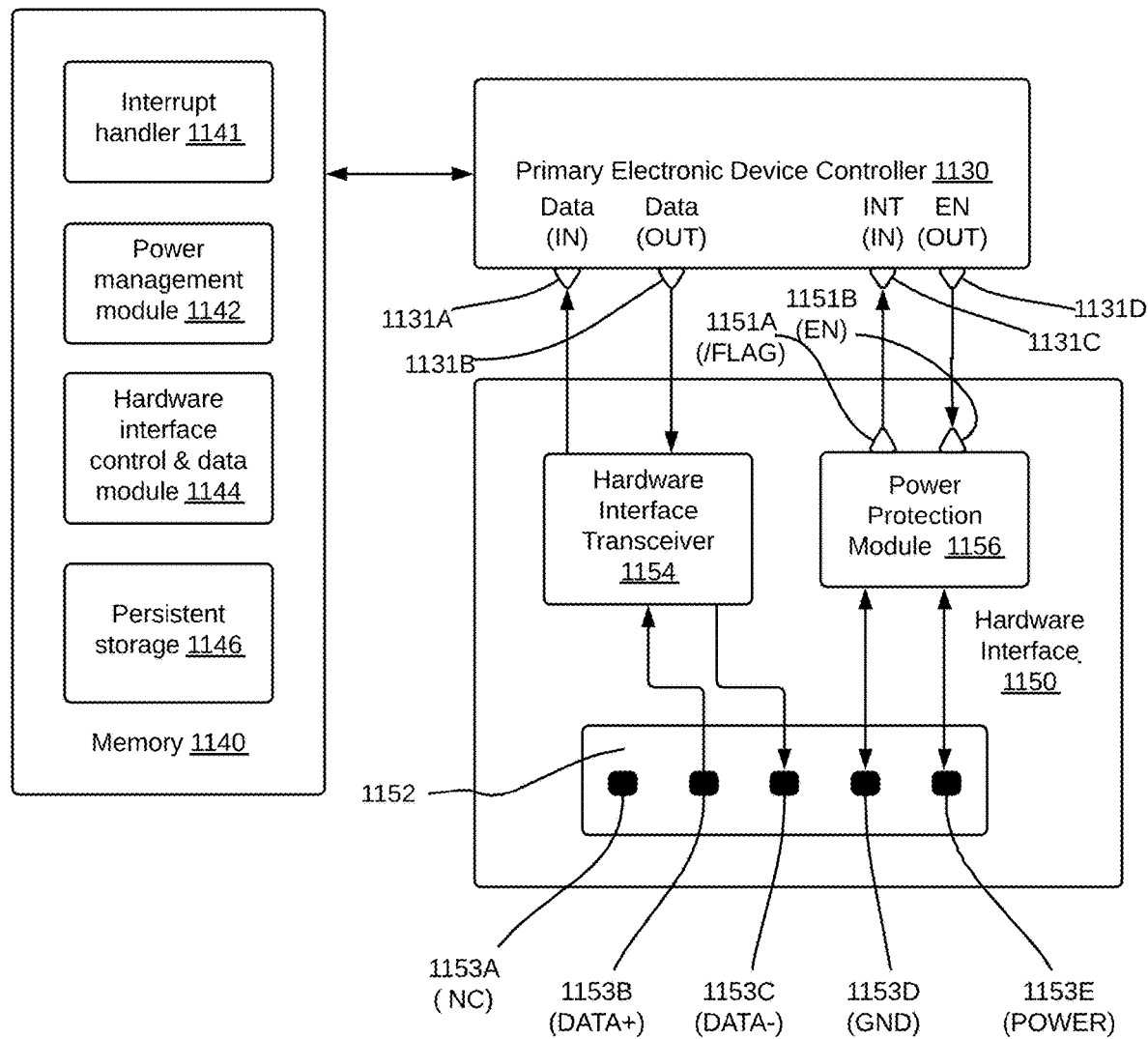
FIG. 12 is a block diagram showing selected components of a primary electronic device pertaining to power protection management, in accordance with embodiments of the present disclosure.

With reference to FIG. 12, there is shown a detailed block diagram of selected components of the primary electronic device 100, namely the primary electronic device controller 1130, the memory 1140, and the hardware interface 1150. Other components of the primary electronic device 1100 are not shown for brevity.

The primary electronic device controller 1130 has a similar structure as the telematics device controller 230 and has pins 1131A, 1131B, 1131C, and 1131D, which are similar the pins 231A, 231B, 231C, and 231D, respectively.

The memory 1140 has a similar structure as the memory 240 of FIG. 6, and is shown containing a number of modules such as the interrupt handler 1141, the power management module 1142, the hardware interface control and data module 1144, and the persistent storage 1146.

The hardware interface module 1150 has a similar structure to the I/O expander interface 250 of FIG. 6. The hardware interface 1150 has a hardware interface transceiver 1154, a power protection module 1156, and a hardware port 1152, which have a similar structure to the I/O expander transceiver 254, the I/O expander power protection module 256, and the interface port 252, respectively.

Figure 13:
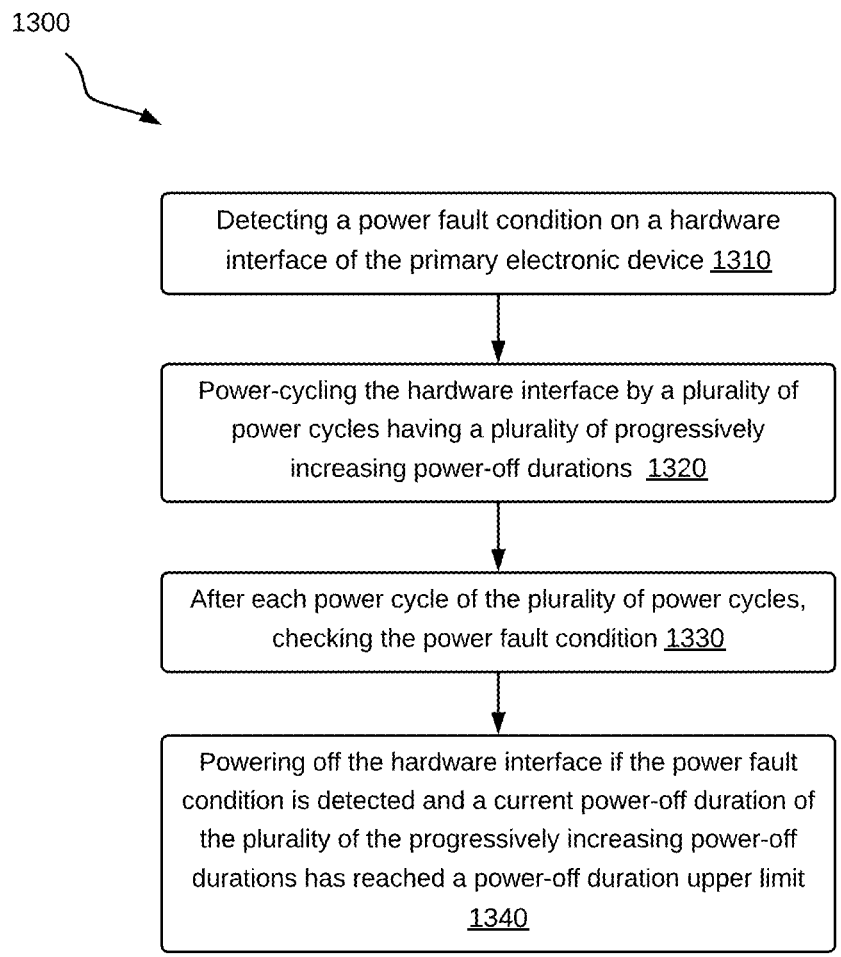
FIG. 13 is a flow chart depicting a method for handling power faults in a hardware interface bus of a primary electronic device, in accordance with embodiments of the present disclosure.

FIG. 13 depicts a method 1300 by a primary electronic device 1100. The method 1300 is for handing power faults on a secondary electronic device 1200 coupled to the hardware interface 1150 of the primary electronic device 100.

At step 1310, the primary electronic device 1100 detects a power fault condition on the hardware interface 1150 thereof.

At step 1320, the primary electronic device 1100 power cycles the hardware interface by a plurality of power cycles having a plurality of progressively increasing power-off durations. After each power cycle, in step 1330, of the power cycles, the primary electronic device 1100 checks the power fault condition.

At step 1340, the primary electronic device 1100 power off the hardware interface 1150 when the power fault condition is detected and the current power-off duration of the plurality of the progressively increasing power-off durations has reached a power-off duration upper limit.

In some embodiments, powering off the hardware interface 1150 comprises setting, in the persistent storage 1146, an indication that the hardware interface 1150 has been powered off due to the power fault.

In some embodiments, the method 1300 further comprises clearing the indication that the hardware interface 1150 has been powered off due to the power fault condition, in response to detecting that the secondary electronic device 1200 has been unplugged from the hardware interface 1150.

In some embodiments, the method 1300 further comprises checking the indication in persistent storage 1146 upon powering up of the primary electronic device 1100 and refraining from powering up the hardware interface 1150 in response to determining that the hardware interface 1150 has been powered off due to the power fault condition.

In some embodiments, detecting the power fault condition comprises detecting, by a power protection module 1156 of the hardware interface 1150 one of an overcurrent condition, an overvoltage condition, and a reverse current condition.

In some embodiments, progressively increasing the power-off durations comprises increasing the current power-off duration between two successive power cycles.

In some embodiments, detecting the power fault condition on the hardware interface 1150 comprises receiving an indication from a power protection module 1156 of the power fault condition.

In some embodiments, receiving the indication from the power protection module 1156 comprises receiving a signal change on a pin or an interrupt signal. For example, the pin 1131C may receive a signal change or an interrupt signal from the power protection module 1156.

Figure 14:
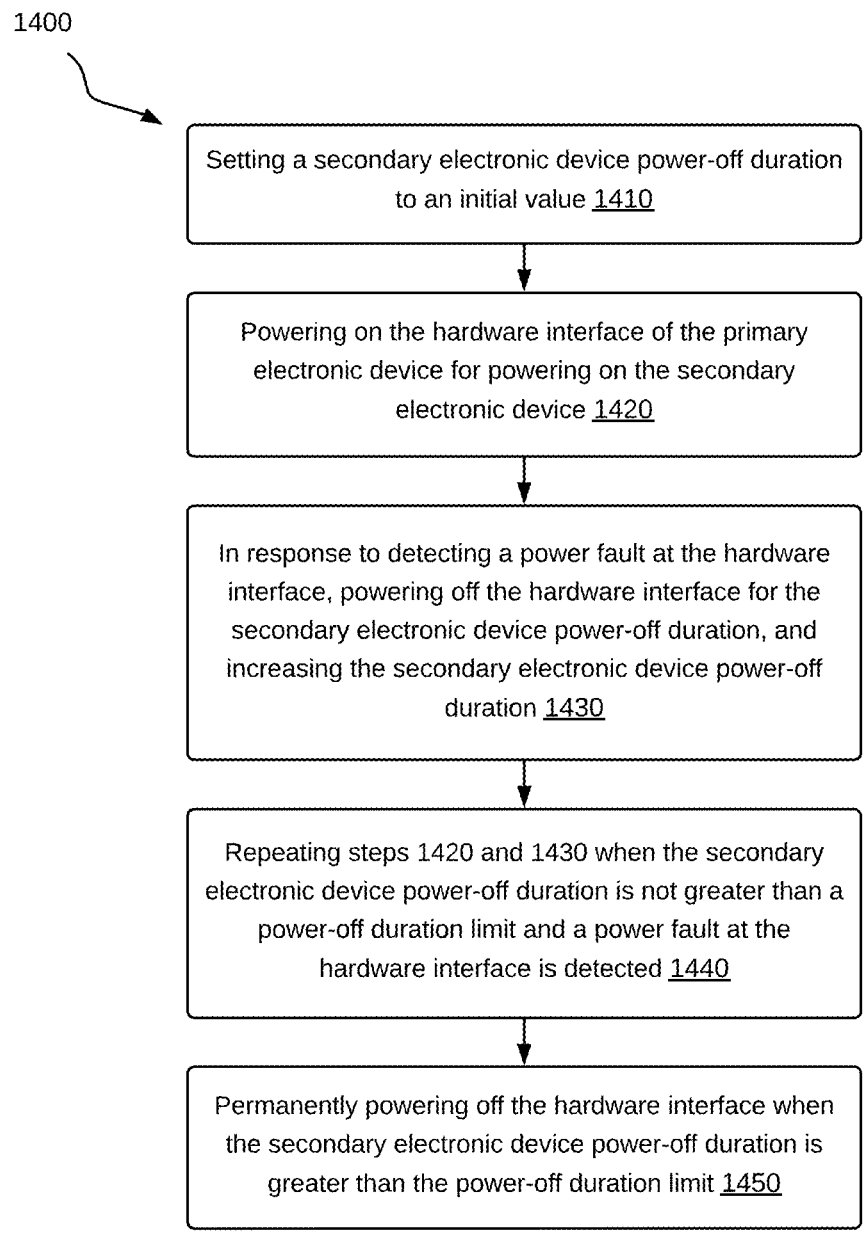
FIG. 14 is a flow chart depicting a method for handling power faults in a hardware interface bus of a primary electronic device, in accordance with other embodiments of the present disclosure.

With reference to FIG. 14, there is shown another method 1400 for handling power faults on a hardware interface of a primary electronic device, in accordance with embodiments of the present disclosure.

At step 1410, the primary electronic device 1100 sets a secondary electronic device power-off duration to an initial value.

At step 1420, the primary electronic device 1100 powers on the hardware interface 1150 for powering on the secondary electronic device 1200, which is connected to the hardware interface 1150.

At step 1430, and in response to detecting a power fault at the hardware interface 1150, the primary electronic device 1100 powers off the hardware interface 1150 for the secondary electronic device power-off duration. The primary electronic device 1100 then increases the secondary electronic device power-off duration.

At step 1440, the primary electronic device 1100 repeats steps 1420 and 1430 when the secondary electronic device power-off duration is not greater than a power-off duration limit and a power fault at the hardware interface is detected.

At step 1450, the primary electronic device 1100 permanently powers off the hardware interface 1150 when the secondary electronic device power-off duration is greater than the power-off duration limit.

It should be noted that certain operations in the methods described herein may be embodied in machine-executable programming instructions storable on non-transitory machine-readable storage medium and executable by a processor or a controller.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method by a primary electronic device, the method for handling power faults on a secondary electronic device coupled to the primary electronic device via a hardware interface of the primary electronic device, the method comprising:

detecting a power fault condition on the hardware interface;

power-cycling the hardware interface by a plurality of power cycles having a plurality of progressively increasing power-off durations;

after each power cycle of the plurality of power cycles, checking the power fault condition; and permanently powering off the hardware interface when the power fault condition is detected and a current power-off duration of the plurality of progressively increasing power-off durations has reached a power-off duration limit.

2. The method of claim 1, wherein powering off the hardware interface comprises setting, in a persistent storage of the primary electronic device, an indication that the hardware interface has been powered off due to a power fault.

3. The method of claim 2, further comprising clearing the indication that the hardware interface has been powered off due to the power fault condition in response to detecting that the secondary electronic device has been unplugged from the hardware interface.

4. The method of claim 2, further comprising checking the indication in the persistent storage upon powering up of the primary electronic device and refraining from powering up the hardware interface in response to determining that the hardware interface has been powered off due to the power fault condition.

5. The method of claim 1, wherein detecting the power fault condition comprises detecting by a power protection module of the hardware interface one of: an overcurrent condition, an overvoltage condition, and a reverse current condition.

6. The method of claim 1, wherein detecting the power fault condition on the hardware interface comprises receiving an indication from a power protection module of the power fault condition.

7. The method of claim 6, wherein receiving the indication from the power protection module comprises receiving a signal change on a pin or receiving an interrupt signal.

8. A primary electronic device, comprising:
a controller;
a hardware interface coupled to the controller, the hardware interface for coupling the primary electronic device to a secondary electronic device;
a memory, coupled to the controller, the memory for storing machine-executable programming instructions which, when executed by the controller, configure the primary electronic device to:
in response to detecting a power fault condition on the hardware interface:
power-cycle the hardware interface by a plurality of power cycles having progressively increasing power-off durations;
after each power cycle of the plurality of power cycles, check the power fault condition; and
permanently power off the hardware interface when the power fault condition is detected and a current power-off duration of the progressively increasing power-off durations has reached a power-off duration limit.

9. The primary electronic device of claim 8, wherein the machine-executable programming instructions which configure the primary electronic device to power off the hardware interface comprise machine-executable programming instructions which configure the primary electronic device to set an indication in a persistent storage thereof that the hardware interface has been powered off due to a power fault.

10. The primary electronic device of claim 9, wherein the machine-executable programming instructions further comprise machine-executable programming instructions which configure the primary electronic device to clear the indication that the hardware interface has been powered off due to the power fault condition in response to detecting that the secondary electronic device has been unplugged from the hardware interface.

11. The primary electronic device of claim 9, wherein the machine-executable programming instructions further comprise machine-executable programming instructions which configure the primary electronic device to check the indication in the persistent storage upon powering up of the primary electronic device and refrain from powering up the hardware interface in response to determining that the hardware interface has been powered off due to the power fault condition.

12. The primary electronic device of claim 8, wherein the machine-executable programming instructions which configure the primary electronic device to detect the power fault condition comprise machine-executable programming instructions which configure the primary electronic device to detect one of: an overcurrent condition, an overvoltage condition, and a reverse current condition.

13. The primary electronic device of claim 8, wherein the machine-executable programming instructions which configure the primary electronic device to progressively increase the progressively increasing power-off durations comprise machine-executable programming instructions which configure the primary electronic device to increase the current power-off duration between two successive power cycles.

14. The primary electronic device of claim 8, wherein the machine-executable programming instructions which configure the primary electronic device to detect the power fault condition on the hardware interface comprise machine-executable programming instructions which configure the primary electronic device to receive an indication, from a power protection module of the hardware interface, of the power fault condition.

15. The primary electronic device of claim 14, wherein the machine-executable programming instructions which configure the primary electronic device to receive the indication from the power protection module comprise machine-executable programming instructions which configure the primary electronic device to receive one of: a signal change on a pin or an interrupt signal.

16. A non-transitory computer-readable medium, storing machine-executable programming instructions which, when executed by a controller, configure a primary electronic device to:
in response to detecting a power fault condition on a hardware interface:
power-cycle the hardware interface by a plurality of power cycles having progressively increasing power-off durations;
after each power cycle of the plurality of power cycles, check the power fault condition; and
permanently power off the hardware interface when the power fault condition is detected and a current power-off duration of the progressively increasing power-off durations has reached a power-off duration limit.

17. The non-transitory computer-readable medium of claim 16, wherein the machine-executable programming instructions which configure the primary electronic device to power off the hardware interface comprise machine-executable programming instructions which configure the primary electronic device to set an indication in a persistent storage thereof that the hardware interface has been powered off due to a power fault.

18. The non-transitory computer-readable medium of claim 17, wherein the machine-executable programming instructions further comprise machine-executable programming instructions which configure the primary electronic device to clear the indication that the hardware interface has been powered off due to the power fault condition in response to detecting that a secondary electronic device has been unplugged from the hardware interface.

19. The non-transitory computer-readable medium of claim 17, wherein the machine-executable programming instructions further comprise machine-executable programming instructions which configure the primary electronic device to check the indication in the persistent storage upon powering up of the primary electronic device and refrain from powering up the hardware interface in response to determining that the hardware interface has been powered off due to the power fault condition.

20. The non-transitory computer-readable medium of claim 16, wherein the machine-executable programming instructions which configure the primary electronic device to detect the power fault condition comprise machine-executable programming instructions which configure the primary electronic device to detect one of: an overcurrent condition, an overvoltage condition, and a reverse current condition.

* * * * *